United States Patent
Elshafie et al.

(10) Patent No.: US 12,537,579 B2
(45) Date of Patent: Jan. 27, 2026

(54) MEDIA ACCESS CONTROL (MAC) CONTROL ELEMENT (CE) (MAC-CE) AND PHYSICAL LAYER (PHY) CHANNEL STATE INFORMATION (CSI) ENHANCEMENTS

(71) Applicant: QUALCOMM Incorporated, San Diego, CA (US)

(72) Inventors: Ahmed Elshafie, San Diego, CA (US); Paul Mcadams, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 442 days.

(21) Appl. No.: 18/325,850

(22) Filed: May 30, 2023

(65) Prior Publication Data

US 2024/0405822 A1    Dec. 5, 2024

(51) Int. Cl.
  *H04B 7/06* (2006.01)
  *H04W 72/1268* (2023.01)
  *H04W 72/21* (2023.01)

(52) U.S. Cl.
  CPC ...... *H04B 7/0626* (2013.01); *H04W 72/1268* (2013.01); *H04W 72/21* (2023.01)

(58) Field of Classification Search
  CPC . H04B 7/0626; H04W 72/21; H04W 72/1268

USPC .......................................................... 370/329
  See application file for complete search history.

(56) References Cited

U.S. PATENT DOCUMENTS

2013/0242902 A1*  9/2013  Liu .................. H04B 7/0626
                                                    370/329

* cited by examiner

*Primary Examiner* — Chi Tang P Cheng
(74) *Attorney, Agent, or Firm* — Kevin M. Donnelly; Seyfarth Shaw LLP

(57) ABSTRACT

A method for wireless communication by a user equipment (UE) includes receiving, from a network node, a first message indicating a set of channel state information (CSI) report configurations and a corresponding set of configuration identifiers (IDs). Each of the set of CSI report configurations may be associated with a respective one of set of CSI reports and a respective ID of the set of configuration IDs. The method also includes transmitting, to the network node, a second message indicating one or more used configuration IDs. The method further includes transmitting, to the network node, a first subset of CSI reports associated with the one or more used configuration IDs. One or more of the first subset of CSI reports may be reallocated resources associated with a second subset of CSI reports. Each of the second subset of CSI reports may be associated with an unused configuration ID.

30 Claims, 11 Drawing Sheets

MEDIA ACCESS CONTROL (MAC) CONTROL ELEMENT (CE) (MAC-CE) AND PHYSICAL LAYER (PHY) CHANNEL STATE INFORMATION (CSI) ENHANCEMENTS

FIELD OF THE DISCLOSURE

The present disclosure relates generally to wireless communications, and more specifically to media access control (MAC) control element (CE) (MAC-CE) and physical layer (PHY) enhancements for channel state information (CSI).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is fifth generation (5G) new radio (NR). 5G NR is part of a continuous mobile broadband evolution promulgated by Third Generation Partnership Project (3GPP) to meet new requirements associated with latency, reliability, security, scalability (for example, with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the fourth generation (4G) long term evolution (LTE) standard. Narrowband (NB)-IoT and enhanced machine-type communications (eMTC) are a set of enhancements to LTE for machine type communications. There exists a need for further improvements in 5G NR technology. These improvements may also be applicable to other multi-access technologies and the telecommunications standards that employ these technologies, such as 6G technology and beyond.

Wireless communications systems may include or provide support for various types of communications systems, such as sidelink communications systems (for example, cellular vehicle-to-everything (CV2X) communications systems). In some cases, sidelink user equipment (UEs), such as vehicles, may communicate directly with each other using device-to-device (D2D) communications over a D2D wireless link.

Wireless communication systems may utilize channel state information (CSI) reports to indicate one or more channel conditions, such as signal quality, interference, and/or noise. In some communication systems, one or more CSI reports may be included in a media access control (MAC) control element (MAC) (MAC-CE). Each CSI report may include unique content and may be associated with a distinct resolution or bitwidth. In some examples, a UE may be configured with a set of report configurations, and each report configuration, of the set of report configurations, may be associated with a respective configuration identifier (ID) of a set of configuration IDs. In some examples, the MAC-CE may include CSI reports corresponding to one or more configuration IDs of the set of configuration IDs.

SUMMARY

In one aspect of the present disclosure, a method for wireless communication at a user equipment (UE) includes receiving, from a network node, a first message indicating a set of channel state information (CSI) report configurations, associated with a set of CSI reports, and a corresponding set of configuration identifiers (IDs). Each CSI report configuration of the set of CSI report configurations may be associated with a respective CSI report of the set of CSI reports and a respective configuration ID of the set of configuration IDs. Each configuration ID may be further associated with a respective priority of a set of priorities. The method still further includes transmitting, to the network node, a second message indicating one or more used configuration IDs of the set of configuration IDs. The method also includes transmitting, to the network node, a first subset of CSI reports, of the set of CSI reports, associated with the one or more used configuration IDs. One or more CSI reports of the first subset of CSI reports being reallocated resources associated with a second subset of CSI reports of the set of CSI reports, each CSI report of the second subset of CSI reports being associated with an unused configuration ID of the set of configuration IDs.

Another aspect of the present disclosure is directed to an apparatus including means for receiving, from a network node, a first message indicating a set of CSI report configurations, associated with a set of CSI reports, and a corresponding set of configuration IDs. Each CSI report configuration of the set of CSI report configurations may be associated with a respective CSI report of the set of CSI reports and a respective configuration ID of the set of configuration IDs. Each configuration ID may be further associated with a respective priority of a set of priorities. The apparatus further includes means for transmitting, to the network node, a second message indicating one or more used configuration IDs of the set of configuration IDs. The apparatus further includes means for transmitting, to the network node, a first subset of CSI reports, of the set of CSI reports, associated with the one or more used configuration IDs. One or more CSI reports of the first subset of CSI reports may be reallocated resources associated with a second subset of CSI reports of the set of CSI reports. Each CSI report of the second subset of CSI reports may be associated with an unused configuration ID of the set of configuration IDs.

In another aspect of the present disclosure, a non-transitory computer-readable medium with non-transitory program code recorded thereon is disclosed. The program code is executed by a processor and includes program code to receive, from a network node, a first message indicating a set of CSI report configurations, associated with a set of CSI reports, and a corresponding set of configuration IDs. Each CSI report configuration of the set of CSI report configurations may be associated with a respective CSI report of the set of CSI reports and a respective configuration ID of the set of configuration IDs. Each configuration ID may be further associated with a respective priority of a set of priorities. The program code still further includes program code to transmit, to the network node, a second message indicating one or more used configuration IDs of the set of configuration IDs. The program code also includes program code to transmit, to the network node, a first subset of CSI reports, of the set of CSI reports, associated with the one or more used configuration IDs. One or more CSI reports of the first subset of CSI reports may be reallocated resources associated with a second subset of CSI reports of the set of CSI reports. Each CSI report of the second subset of CSI reports may be associated with an unused configuration ID of the set of configuration IDs.

Another aspect of the present disclosure is directed to an apparatus including a processor and a memory coupled with the processor. The memory stores instructions operable, when executed by the processor, to cause the apparatus to receive, from a network node, a first message indicating a set of CSI report configurations, associated with a set of CSI reports, and a corresponding set of configuration IDs. Each CSI report configuration of the set of CSI report configurations may be associated with a respective CSI report of the set of CSI reports and a respective configuration ID of the set of configuration IDs. Each configuration ID may be further associated with a respective priority of a set of priorities. Execution of the instructions also cause the apparatus to transmit, to the network node, a second message indicating one or more used configuration IDs of the set of configuration IDs. Execution of the instructions further cause the apparatus to transmit, to the network node, a first subset of CSI reports, of the set of CSI reports, associated with the one or more used configuration IDs. One or more CSI reports of the first subset of CSI reports may be reallocated resources associated with a second subset of CSI reports of the set of CSI reports. Each CSI report of the second subset of CSI reports may be associated with an unused configuration ID of the set of configuration IDs.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
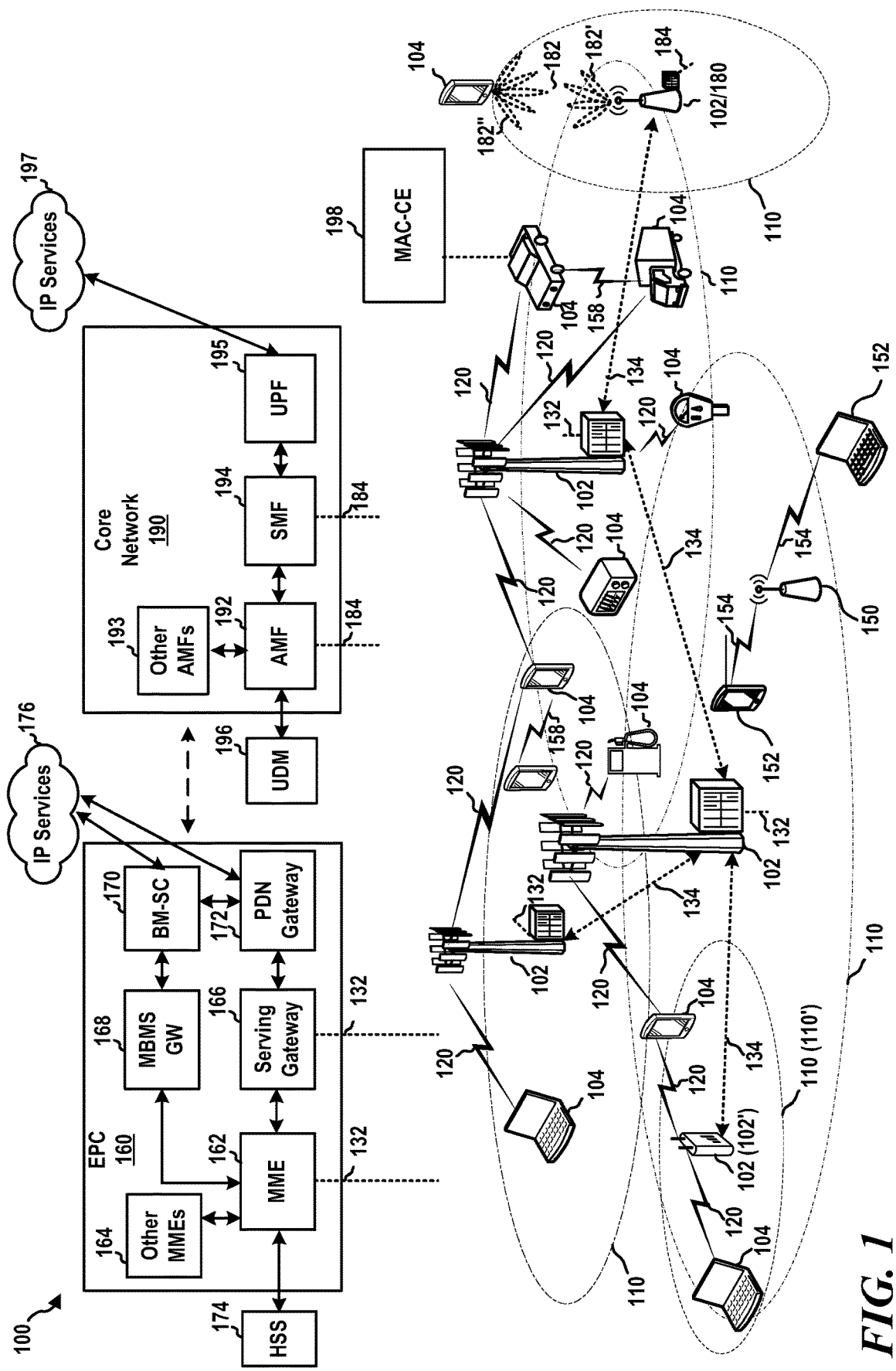
FIG. 1 is a diagram illustrating an example of a wireless communications system and an access network.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure disclosed, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology associated with 5G wireless technologies, aspects of the present disclosure can be applied in later generations, including for 6G wireless technologies, or in other wireless communications systems.

In cellular communications networks, wireless devices may generally communicate with each other via access links with one or more network entities such as a base station or scheduling entity. Some cellular networks may also support device-to-device (D2D) communications that enable discovery of, and communications among, nearby devices using direct links between devices (for example, without passing through a base station, relay, or other network entity). D2D communications may also be referred to as point-to-point (P2P) or sidelink communications. D2D communications may be implemented using licensed or unlicensed bands. Using D2D communications, devices can avoid some of the overhead that would otherwise be involved with routing to and from a network entity. D2D communications can also enable mesh networking and device-to-network relay functionality.

Vehicle-to-everything (V2X) communication is an example of D2D communication that is specifically geared toward automotive use cases. V2X communications may enable autonomous vehicles to communicate with each other. In some examples, V2X communications may enable a group of autonomous vehicles to share respective sensor information. For example, each autonomous vehicle may include multiple sensors or sensing technologies (for example, light detection and ranging (LiDAR), radar, cameras, etc.). In most cases, an autonomous vehicle's sensors are limited to detecting objects within the sensors' line of sight. In contrast, based on the sensor information shared via V2X communications, one or more autonomous vehicles in the group of autonomous vehicles may be made aware of an out of sight object. In such examples, the object may be within a line of sight of sensors associated with another autonomous vehicle in the group of autonomous vehicles. Additionally, or alternatively, based on the sensor information shared via V2X communications, two or more autonomous vehicle in the group of autonomous vehicles may coordinate one or more actions, such as avoiding the object or maintaining a pre-determined distance between the two or more autonomous vehicles.

Sidelink (SL) communication is another example of D2D communication that enables a user equipment (UE) to communicate with another UE without tunneling through a base station and/or a core network. Sidelink communications can be communicated over a physical sidelink control channel (PSCCH) and a physical sidelink shared channel (PSSCH). The PSCCH and PSSCH are similar to a physical downlink control channel (PDCCH) and a physical downlink shared channel (PDSCH) in downlink (DL) communications between a base station and a UE. For instance, the PSCCH may carry sidelink control information (SCI) and the PSCCH may carry sidelink data (for example, user data). Each PSCCH is associated with a corresponding PSSCH, where SCI in a PSCCH may carry reservation and/or scheduling information for a sidelink data transmission in the associated PSSCH. Use cases for sidelink communications may include, among others, V2X, industrial Internet of Things (IoT) (IIoT), and/or NR-lite.

In some wireless communication systems, such as sidelink communication systems, one or more CSI reports may be included in a media access control (MAC) control element (MAC) (MAC-CE). Each CSI report may include unique content and may be associated with a distinct resolution or bitwidth. In some examples, a UE may receive, from a network node, a message indicating a set of CSI report configurations, associated with a set of CSI reports, and a corresponding set of configuration identifiers (IDs). Each CSI report configuration may be associated with a respective CSI report of the set of CSI reports and a respective configuration ID of the set of configuration IDs. In some examples, the UE may transmit a subset of CSI reports of the set of CSI reports. In such examples, resources allocated to CSI reports that are not included in the subset of CSI reports may remain unused. Thus, the allocation of resources for CSI reports may be inefficient and may reduce overall performance of the wireless communication network.

Various aspects of the present disclosure are directed to maximizing or otherwise increasing the available resources for useful CSI reports to be transmitted to a network node by allowing a UE to reallocate resources associated with unused CSI reports that are not transmitted to the network node. For example, a UE may receive, from the network node, a first message indicating a set of CSI report configurations, associated with a set of CSI reports, and a corresponding set of configuration IDs. Each CSI report configuration may be associated with a respective CSI report of the set of CSI reports and a respective configuration ID of the set of configuration IDs. In some examples, the UE may transmit a second message indicating one or more used configuration IDs of the set of configuration IDs. The one or more used configuration IDs may indicate which CSI reports will be included in a MAC-CE. The UE may then transmit a set of used CSI reports, associated with the one or more used configuration IDs. In such examples, one or more of the used CSI reports may be reallocated resources that were associated with a set of unused CSI reports of the set of CSI reports. Each one of the unused CSI reports is associated with a respective unused configuration ID of the set of configuration IDs. In some examples, the second message and the first subset of CSI reports may be transmitted via a single MAC-CE or multi-stage MAC-CE.

Particular aspects of the subject matter described in this disclosure can be implemented to realize one or more of the following potential advantages. In some examples, reallocating resources associated with unused CSI reports to one or more used CSI reports may increase an amount of respective resources allocated to each of the one or more used CSI reports. This increase in resources may allow the UE to include additional information in each of the one or more used CSI reports. As a result, the one or more used CSI reports may provide a more detailed and accurate representation of one or more channel conditions, thereby improving the overall performance and reliability of a wireless communication system.

FIG. 1 is a diagram illustrating an example of a wireless communications system and an access network 100. The wireless communications system (also referred to as a wireless wide area network (WWAN)) includes base stations 102, UEs 104, an evolved packet core (EPC) 160, and another core network 190 (for example, a 5G core (5GC)). The base stations 102 may include macrocells (high power cellular base station) and/or small cells 102' (low power cellular base station). The macrocells include base stations. The small cells 102' include femtocells, picocells, and microcells.

The base stations 102 configured for 4G LTE (collectively referred to as evolved universal mobile telecommunications system (UMTS) terrestrial radio access network (E-UTRAN)) may interface with the EPC 160 through backhaul links 132 (for example, S1 interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over backhaul links 134 (for example, X2 interface). The backhaul links 134 may be wired or wireless.

The base stations 102 may wirelessly communicate with the UEs 104. Each of the base stations 102 may provide communications coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). The communications links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communications links 120 may use multiple-input and multiple-output (MIMO) antenna technology, including spatial multiplexing, beamforming, and/or transmit diversity. The communications links may be through one or more carriers. The base stations 102/UEs 104 may use spectrum up to Y MHz (for example, 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communications link 158. The D2D communications link 158 may use the DL/UL WWAN spectrum. The D2D communications link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communications may be through a variety of wireless D2D communications systems, such as FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communications links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (for example, macro base station), may include a NR BS, a Node B, a 5G node B, an eNB, a gNodeB (gNB), an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC. Some base stations, such as gNB 180 may operate in a traditional sub 6 GHz spectrum, in millimeter wave (mmWave) frequencies, and/or near mm Wave frequencies in communication with the UE 104. When the gNB 180 operates in mmWave or near mmWave frequencies, the gNB 180 may be referred to as an mmWave base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave. Communications using the mm Wave/near mmWave radio frequency band (for example, 3 GHZ-300 GHz) has extremely high path loss and a short range. The mmWave base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182″. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a mobility management entity (MME) 162, other MMEs 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting eMBMS related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QOS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit and receive point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a receiving device, such as the UE 104, may receive sensing information from one or more other UEs 104. The UE 104 that received the sensing information may also obtain sensing information from its own measurements. The UE 104 may include a MAC-CE component 198 configured to perform various steps, such as the steps of the process 1100 discussed with reference to FIG. 11.

Although the following description may be focused on 5G NR, it may be applicable to other similar areas, such as LTE, LTE-A, CDMA, GSM, and other wireless technologies.

Figure 2:
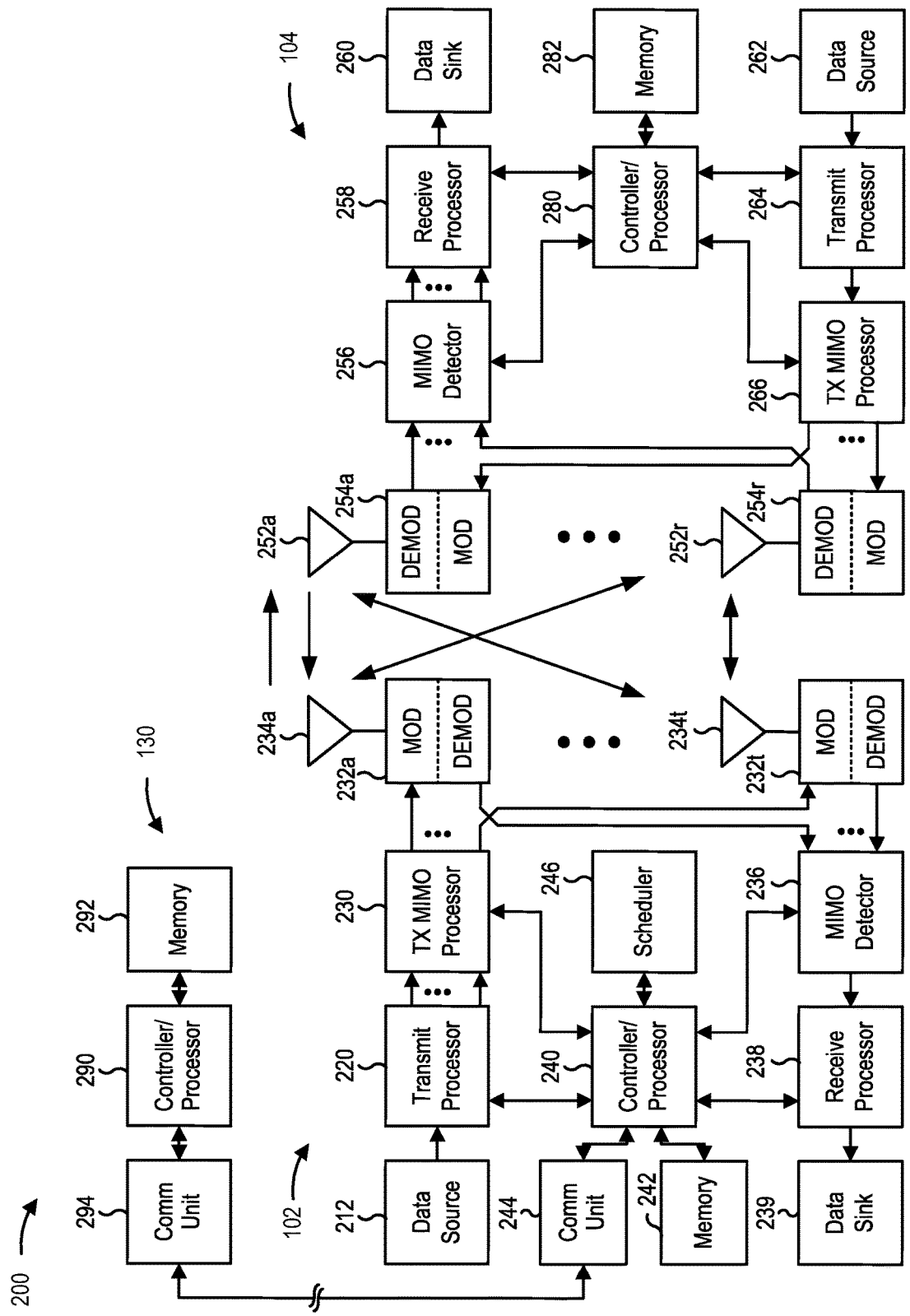
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 102 and UE 104, which may be one of the base stations and one of the UEs in FIG. 1, respectively. The base station 102 may be equipped with T antennas 234a through 234t, and UE 104 may be equipped with R antennas 252a through 252r, where in general T≥1 and R≥1.

At the base station 102, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and/or the like) and control information (for example, CQI requests, grants, upper layer signaling, and/or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and/or the reference symbols, if applicable, and may provide T output symbol streams to T modulators (MODs) 232a through 232t. Each modulator 232 may process a respective output symbol stream (for example, for orthogonal frequency division multiplexing (OFDM) and/or the like) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 104, antennas 252a through 252r may receive the downlink signals from the base station 102 and/or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 104 may be included in a housing.

On the uplink, at the UE 104, a transmit processor 264 may receive and process data from a data source 262 and control information (for example, for reports comprising RSRP, RSSI, RSRQ, CQI, and/or the like) from the controller/processor 280. The transmit processor 264 may also generate reference symbols for one or more reference signals. The symbols from the transmit processor 264 may be precoded by a TX MIMO processor 266 if applicable, further processed by modulators 254a through 254r (for example, for discrete Fourier transform spread (DFT-s)-OFDM, CP-OFDM, and/or the like), and transmitted to the base station 102. At the base station 102, the uplink signals from the UE 104 and other UEs may be received by the antennas 234, processed by the demodulators 254, detected by a MIMO detector 236 if applicable, and further processed by a receive processor 238 to obtain decoded data and control information sent by the UE 104. The receive processor 238 may provide the decoded data to a data sink 239 and the decoded control information to a controller/processor 240. The base station 102 may include communications unit 244 and communicate to the core network 130 via the communications unit 244. The core network 130 may include a communications unit 294, a controller/processor 290, and a memory 292.

The controller/processor 240 of the base station 102, the controller/processor 280 of the UE 104, and/or any other component(s) of FIG. 2 may perform one or more techniques associated with configuring a relay-based sidelink network as described in more detail elsewhere. For example, the controller/processor 240 of the base station 102, the controller/processor 280 of the UE 104, and/or any other component(s) of FIG. 2 may perform or direct operations of, for example, the processes of FIGS. 10 and 12 and/or other processes as described. Memories 242 and 282 may store data and program codes for the base station 102 and UE 104, respectively. A scheduler 246 may schedule UEs for data transmission on the downlink and/or uplink.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (for example, a virtual central unit (VCU), a virtual distributed unit (VDU), or a virtual radio unit (VRU)).

Base station-type operations or network designs may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

At least one of the transmit processor 264, the receive processor 258, and the controller/processor 280 may be configured to perform aspects in connection with the MAC-CE component 198 of FIG. 1.

Figure 3:
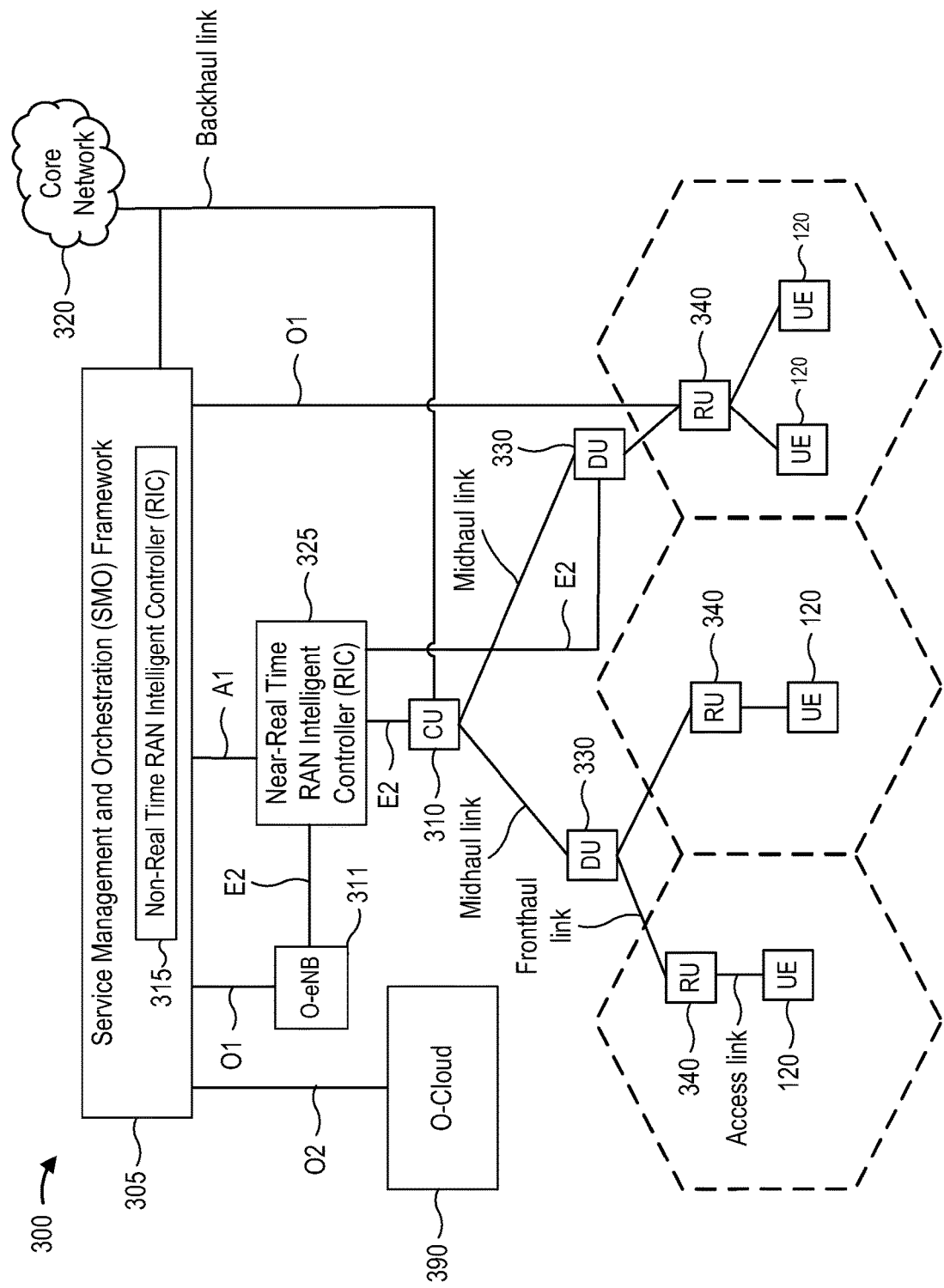
FIG. 3 is a block diagram illustrating an example disaggregated base station architecture, in accordance with various aspects of the present disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUS) 340 via respective fronthaul links. The RUs 340 may communicate with respective UEs 104 via one or more radio frequency (RF) access links. In some implementations, the UE 104 may be simultaneously served by multiple RUs 340.

Each of the units (for example, the CUS 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (for example, central unit-user plane (CU-UP)), control plane functionality (for example, central unit-control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 104. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO framework 305 may be configured to support RAN deployment and provisioning of non-virtualized and virtualized network elements. For non-virtualized network elements, the SMO framework 305 may be configured to support the deployment of dedicated physical resources for RAN coverage requirements, which may be managed via an operations and maintenance interface (such as an O1 interface). For virtualized network elements, the SMO framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO framework 305 can communicate with a hardware aspect of a 4G RAN, such as an open eNB (O-eNB) 311, via an O1 interface. Additionally, in some implementations, the SMO framework 305 can communicate directly with one or more RUs 340 via an O1 interface. The SMO framework 305 also may include a non-RT RIC 315 configured to support functionality of the SMO framework 305.

The non-RT RIC 315 may be configured to include a logical function that enables non-real-time control and optimization of RAN elements and resources, artificial intelligence/machine learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO framework 305 (such as reconfiguration via 01) or via creation of RAN management policies (such as A1 policies).

Figure 4:
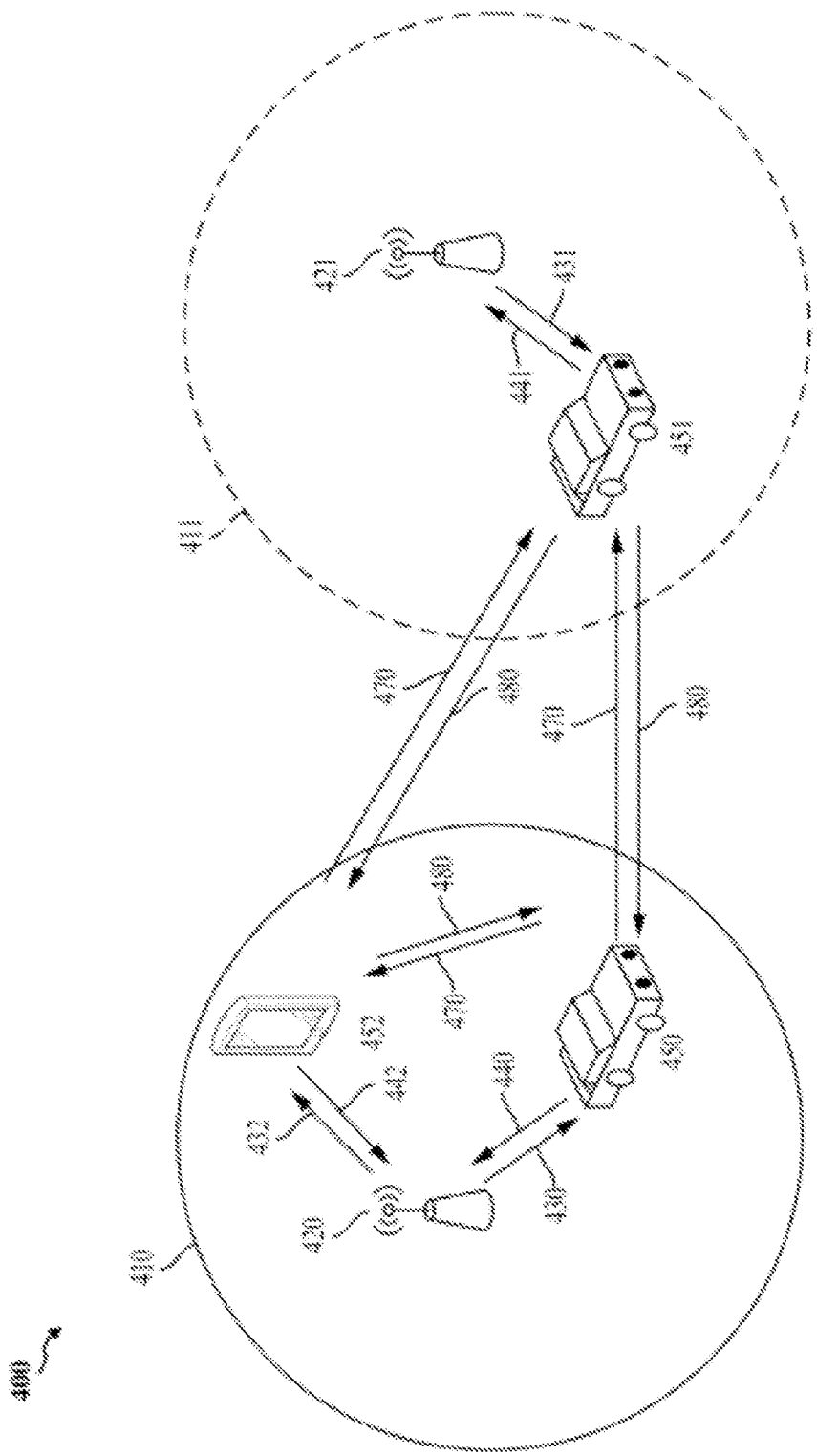
FIG. 4 is a diagram illustrating an example of a vehicle-to-everything (V2X) system, in accordance with various aspects of the present disclosure.

FIG. 4 is a diagram of a device-to-device (D2D) communications system 400, including V2X communications, in accordance with various aspects of the present disclosure. For example, the D2D communications system 400 may include V2X communications, (for example, a first UE 450 communicating with a second UE 451). In some aspects, the first UE 450 and/or the second UE 451 may be configured to communicate in a licensed radio frequency spectrum and/or a shared radio frequency spectrum. The shared radio frequency spectrum may be unlicensed, and therefore multiple different technologies may use the shared radio frequency spectrum for communications, including new radio (NR), LTE, LTE-Advanced, licensed assisted access (LAA), dedicated short range communications (DSRC), MuLTE-Fire, 4G, and the like. The foregoing list of technologies is to be regarded as illustrative, and is not meant to be exhaustive.

The D2D communications system 400 may use NR radio access technology. Of course, other radio access technologies, such as LTE radio access technology, may be used. In D2D communications (for example, V2X communications or vehicle-to-vehicle (V2V) communications), the UEs 450,

451 may be on networks of different mobile network operators (MNOs). Each of the networks may operate in its own radio frequency spectrum. For example, the air interface to a first UE 450 (for example, Uu interface) may be on one or more frequency bands different from the air interface of the second UE 451. The first UE 450 and the second UE 451 may communicate via a sidelink component carrier, for example, via the PC5 interface. In some examples, the MNOs may schedule sidelink communications between or among the UEs 450, 451 in licensed radio frequency spectrum and/or a shared radio frequency spectrum (for example, 5 GHz radio spectrum bands).

The shared radio frequency spectrum may be unlicensed, and therefore different technologies may use the shared radio frequency spectrum for communications. In some aspects, a D2D communications (for example, sidelink communications) between or among UEs 450, 451 is not scheduled by MNOs. The D2D communications system 400 may further include a third UE 452.

The third UE 452 may operate on the first network 410 (for example, of the first MNO) or another network, for example. The third UE 452 may be in D2D communications with the first UE 450 and/or second UE 451. The first base station 420 (for example, gNB) may communicate with the third UE 452 via a downlink (DL) carrier 432 and/or an uplink (UL) carrier 442. The DL communications may be use various DL resources (for example, DL subframes and/or DL channels). The UL communications may be performed via the UL carrier 442 using various UL resources (for example, UL subframes and/or UL channels).

The first network 410 operates in a first frequency spectrum and includes the first base station 420 (for example, gNB) communicating at least with the first UE 450, for example, as described in FIGS. 1-3. The first base station 420 (for example, gNB) may communicate with the first UE 450 via a DL carrier 430 and/or an UL carrier 440. The DL communications may be use various DL resources (for example, DL subframes and/or DL channels). The UL communications may be performed via the UL carrier 440 using various UL resources (for example, UL subframes and/or UL channels).

In some aspects, the second UE 451 may be on a different network from the first UE 450. In some aspects, the second UE 451 may be on a second network 411 (for example, of the second MNO). The second network 411 may operate in a second frequency spectrum (for example, a second frequency spectrum different from the first frequency spectrum) and may include the second base station 421 (for example, gNB) communicating with the second UE 451, for example, as described in FIGS. 1-3.

The second base station 421 may communicate with the second UE 451 via a DL carrier 431 and an UL carrier 441. The DL communications are performed via the DL carrier 431 using various DL resources (for example, DL subframes and/or DL channels). The UL communications are performed via the UL carrier 441 using various UL resources (for example, UL subframes and/or UL channels).

In conventional systems, the first base station 420 and/or the second base station 421 assign resources to the UEs for device-to-device (D2D) communications (for example, V2X communications and/or V2V communications). For example, the resources may be a pool of UL resources, both orthogonal (for example, one or more frequency division multiplexing (FDM) channels) and non-orthogonal (for example, code division multiplexing (CDM)/resource spread multiple access (RSMA) in each channel). The first base station 420 and/or the second base station 421 may configure the resources via the PDCCH (for example, faster approach) or RRC (for example, slower approach).

In some systems, each UE 450, 451 autonomously selects resources for D2D communications. For example, each UE 450, 451 may sense and analyze channel occupation during the sensing window. The UEs 450, 451 may use the sensing information to select resources from the sensing window. As discussed, one UE 451 may assist another UE 450 in performing resource selection. The UE 451 providing assistance may be referred to as the receiver UE or partner UE, which may potentially notify the transmitter UE 450. The transmitter UE 450 may transmit information to the receiving UE 451 via sidelink communications.

The D2D communications (for example, V2X communications and/or V2V communications) may be carried out via one or more sidelink carriers 470, 480. The one or more sidelink carriers 470, 480 may include one or more channels, such as a physical sidelink broadcast channel (PSBCH), a physical sidelink discovery channel (PSDCH), a physical sidelink shared channel (PSSCH), and a physical sidelink control channel (PSCCH), for example.

In some examples, the sidelink carriers 470, 480 may operate using the PC5 interface. The first UE 450 may transmit to one or more (for example, multiple) devices, including to the second UE 451 via the first sidelink carrier 470. The second UE 451 may transmit to one or more (for example, multiple) devices, including to the first UE 450 via the second sidelink carrier 480.

In some aspects, the UL carrier 440 and the first sidelink carrier 470 may be aggregated to increase bandwidth. In some aspects, the first sidelink carrier 470 and/or the second sidelink carrier 480 may share the first frequency spectrum (with the first network 410) and/or share the second frequency spectrum (with the second network 411). In some aspects, the sidelink carriers 470, 480 may operate in an unlicensed/shared radio frequency spectrum.

In some aspects, sidelink communications on a sidelink carrier may occur between the first UE 450 and the second UE 451. In an aspect, the first UE 450 may perform sidelink communications with one or more (for example, multiple) devices, including the second UE 451 via the first sidelink carrier 470. For example, the first UE 450 may transmit a broadcast transmission via the first sidelink carrier 470 to the multiple devices (for example, the second and third UEs 451, 452). The second UE 451 (for example, among other UEs) may receive such broadcast transmission. Additionally or alternatively, the first UE 450 may transmit a multicast transmission via the first sidelink carrier 470 to the multiple devices (for example, the second and third UEs 451, 452). The second UE 451 and/or the third UE 452 (for example, among other UEs) may receive such multicast transmission. The multicast transmissions may be connectionless or connection-oriented. A multicast transmission may also be referred to as a groupcast transmission.

Furthermore, the first UE 450 may transmit a unicast transmission via the first sidelink carrier 470 to a device, such as the second UE 451. The second UE 451 (for example, among other UEs) may receive such unicast transmission. Additionally or alternatively, the second UE 451 may perform sidelink communications with one or more (for example, multiple) devices, including the first UE 450 via the second sidelink carrier 480. For example, the second UE 451 may transmit a broadcast transmission via the second sidelink carrier 480 to the multiple devices. The first UE 450 (for example, among other UEs) may receive such broadcast transmission.

In another example, the second UE 451 may transmit a multicast transmission via the second sidelink carrier 480 to the multiple devices (for example, the first and third UEs 450, 452). The first UE 450 and/or the third UE 452 (for example, among other UEs) may receive such multicast transmission. Further, the second UE 451 may transmit a unicast transmission via the second sidelink carrier 480 to a device, such as the first UE 450. The first UE 450 (for example, among other UEs) may receive such unicast transmission. The third UE 452 may communicate in a similar manner.

In some aspects, for example, such sidelink communications on a sidelink carrier between the first UE 450 and the second UE 451 may occur without having MNOs allocating resources (for example, one or more portions of a resource block (RB), slot, frequency band, and/or channel associated with a sidelink carrier 470, 480) for such communications and/or without scheduling such communications. Sidelink communications may include traffic communications (for example, data communications, control communications, paging communications and/or system information communications). Further, sidelink communications may include sidelink feedback communications associated with traffic communications (for example, a transmission of feedback information for previously-received traffic communications). Sidelink communications may employ at least one sidelink communications structure having at least one feedback symbol. The feedback symbol of the sidelink communications structure may allot for any sidelink feedback information that may be communicated in the device-to-device (D2D) communications system 400 between devices (for example, a first UE 450, a second UE 451, and/or a third UE 452. As discussed, a UE may be a vehicle (for example, UE 450, 451), a mobile device (for example, 452), or another type of device. In some cases, a UE may be a special UE, such as a roadside unit (RSU).

Figure 5:
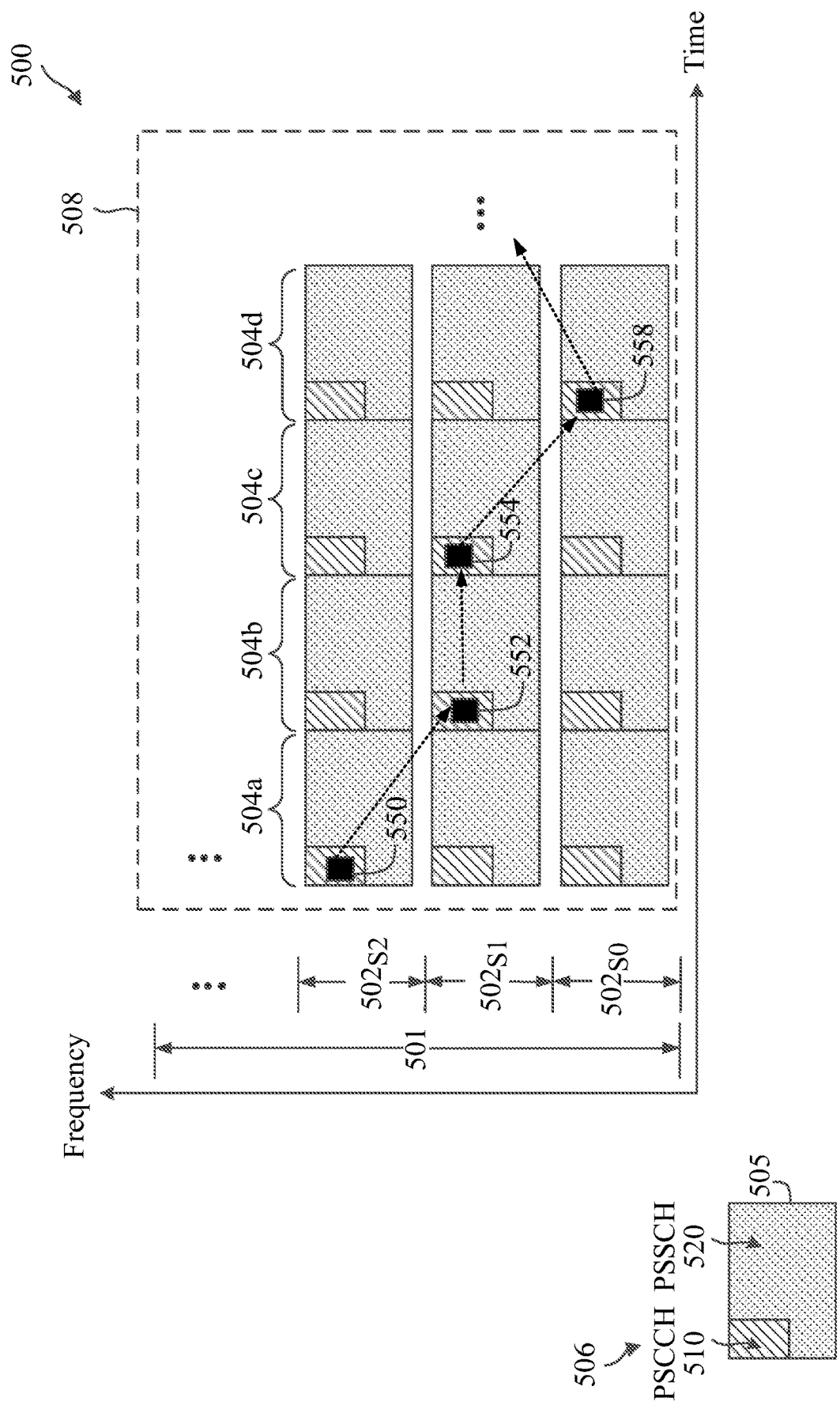
FIG. 5 is a graph illustrating a sidelink (SL) communications scheme, in accordance with various aspects of the present disclosure.

FIG. 5 is a graph illustrating a sidelink (SL) communications scheme, in accordance with various aspects of the present disclosure. A scheme 500 may be employed by UEs such as the UEs 104 in a network such as the network 100. In FIG. 5, the x-axis represents time and the y-axis represents frequency. The CV2X channels may be for 3GPP Release 15 and beyond.

In the scheme 500, a shared radio frequency band 501 is partitioned into multiple subchannels or frequency subbands 502 (shown as $502_{S0}$, $502_{S1}$, $502S2$) in frequency and multiple sidelink frames 504 (shown as 504a, 504b, 504c, 504d) in time for sidelink communications. The frequency band 501 may be at any suitable frequencies. The frequency band 501 may have any suitable bandwidth (BW) and may be partitioned into any suitable number of frequency subbands 502. The number of frequency subbands 502 can be dependent on the sidelink communications BW requirement.

Each sidelink frame 504 includes a sidelink resource 505 in each frequency subband 502. A legend 506 indicates the types of sidelink channels within a sidelink resource 505. In some instances, a frequency gap or guard band may be specified between adjacent frequency subbands 502, for example, to mitigate adjacent band interference. The sidelink resource 505 may have a substantially similar structure as an NR sidelink resource. For instance, the sidelink resource 505 may include a number of subcarriers or RBs in frequency and a number of symbols in time. In some instances, the sidelink resource 505 may have a duration between about one millisecond (ms) to about 20 ms. Each sidelink resource 505 may include a PSCCH 510 and a PSSCH 520. The PSCCH 510 and the PSSCH 520 can be multiplexed in time and/or frequency. The PSCCH 510 may be for part one of a control channel (CCH), with the second part arriving as a part of the shared channel allocation. In the example of FIG. 5, for each sidelink resource 505, the PSCCH 510 is located during the beginning symbol(s) of the sidelink resource 505 and occupies a portion of a corresponding frequency subband 502, and the PSSCH 520 occupies the remaining time-frequency resources in the sidelink resource 505. In some instances, a sidelink resource 505 may also include a physical sidelink feedback channel (PSFCH), for example, located during the ending symbol(s) of the sidelink resource 505. In general, a PSCCH 510, a PSSCH 520, and/or a PSFCH may be multiplexed within a sidelink resource 505.

The PSCCH 510 may carry SCI 550 and/or sidelink data. The sidelink data can be of various forms and types depending on the sidelink application. For instance, when the sidelink application is a V2X application, the sidelink data may carry V2X data (for example, vehicle location information, traveling speed and/or direction, vehicle sensing measurements, etc.). Alternatively, when the sidelink application is an IIoT application, the sidelink data may carry IIOT data (for example, sensor measurements, device measurements, temperature readings, etc.). The PSFCH can be used for carrying feedback information, for example, hybrid automatic repeat request (HARQ) acknowledgement (ACK)/negative acknowledgment (NACK) for sidelink data received in an earlier sidelink resource 505.

In an NR sidelink frame structure, the sidelink frames 504 in a resource pool 508 may be contiguous in time. A sidelink UE (for example, the UEs 104) may include, in SCI 550, a reservation for a sidelink resource 505 in a later sidelink frame 504. Thus, another sidelink UE (for example, a UE in the same NR-U sidelink system) may perform SCI sensing in the resource pool 508 to determine whether a sidelink resource 505 is available or occupied. For instance, if the sidelink UE detected SCI indicating a reservation for a sidelink resource 505, the sidelink UE may refrain from transmitting in the reserved sidelink resource 505. If the sidelink UE determines that there is no reservation detected for a sidelink resource 505, the sidelink UE may transmit in the sidelink resource 505. As such, SCI sensing can assist a UE in identifying a target frequency subband 502 to reserve for sidelink communications and to avoid intra-system collision with another sidelink UE in the NR sidelink system. In some aspects, the UE may be configured with a sensing window for SCI sensing or monitoring to reduce intra-system collision.

In some aspects, the sidelink UE may be configured with a frequency hopping pattern. In this regard, the sidelink UE may hop from one frequency subband 502 in one sidelink frame 504 to another frequency subband 502 in another sidelink frame 504. In the illustrated example of FIG. 5, during the sidelink frame 504a, the sidelink UE transmits SCI 550 in the sidelink resource 505 located in the frequency subband $502_{S2}$ to reserve a sidelink resource 505 in a next sidelink frame 504b located at the frequency subband $502_{S1}$. Similarly, during the sidelink frame 504b, the sidelink UE transmits SCI 552 in the sidelink resource 505 located in the frequency subband $502_{S1}$ to reserve a sidelink resource 505 in a next sidelink frame 504c located at the frequency subband $502_{S1}$. During the sidelink frame 504c, the sidelink UE transmits SCI 554 in the sidelink resource 505 located in the frequency subband $502_{S1}$ to reserve a sidelink resource 505 in a next sidelink frame 504d located at the frequency subband $502_{S0}$. During the sidelink frame 504d, the sidelink UE transmits SCI 558 in the sidelink resource 505 located in the frequency subband $502_{S0}$. The SCI 558 may reserve a sidelink resource 505 in a later sidelink frame 504.

The SCI can also indicate scheduling information and/or a destination identifier (ID) identifying a target receiving sidelink UE for the next sidelink resource 505. Thus, a sidelink UE may monitor SCI transmitted by other sidelink UEs. Upon detecting SCI in a sidelink resource 505, the sidelink UE may determine whether the sidelink UE is the target receiver based on the destination ID. If the sidelink UE is the target receiver, the sidelink UE may proceed to receive and decode the sidelink data indicated by the SCI. In some aspects, multiple sidelink UEs may simultaneously communicate sidelink data in a sidelink frame 504 in different frequency subband (for example, via frequency division multiplexing (FDM)). For instance, in the sidelink frame 504b, one pair of sidelink UEs may communicate sidelink data using a sidelink resource 505 in the frequency subband 502S2 while another pair of sidelink UEs may communicate sidelink data using a sidelink resource 505 in the frequency subband 502S1.

In some aspects, the scheme 500 is used for synchronous sidelink communications. That is, the sidelink UEs may be synchronized in time and are aligned in terms of symbol boundary, sidelink resource boundary (for example, the starting time of sidelink frames 504). The sidelink UEs may perform synchronization in a variety of forms, for example, based on sidelink synchronization signal blocks (SSBs) received from a sidelink UE and/or NR-U SSBs received from a base station (for example, the base station 102) while in-coverage of the base station. In some aspects, the sidelink UE may be preconfigured with the resource pool 508 in the frequency band 501, for example, while in coverage of a serving base station. The resource pool 508 may include a plurality of sidelink resources 505. The base station can configure the sidelink UE with a resource pool configuration indicating resources in the frequency band 501 and/or the subbands 502 and/or timing information associated with the sidelink frames 504. In some aspects, the scheme 500 includes mode-2 RRA (for example, supporting autonomous radio resource allocation (RRA) that can be used for out-of-coverage sidelink UEs or partial-coverage sidelink UEs).

CSI reporting via a sidelink channel is supported in at least Release 16 of the 3GPP Standard. The CSI report may include a channel quality indicator (CQI) and a rank indicator (RI). The CQI and RI may be reported together. Additionally, the CSI may include a precoding matrix indicator (PMI) and/or beam information. The CQI may be in the form of an index referencing a certain modulation and coding scheme (MCS) and/or code-rate in a CQI lookup table. In some examples, a UE can transmit a sidelink reference signal (SL-RS) within a unicast physical sidelink shared channel (PSSCH) transmission, provided that CSI reporting is enabled by a higher layer parameter (for example, sl-CSI-Acquisition), and a CSI request field in a corresponding SCI format is appropriately flagged (for example, if the CSI request field is set to one). The higher layer signaling may configure various parameters for SL-RS transmission. The parameters may include, for example, nrofPortsCSIRS-SL, which indicates a number of ports for SL-RSs (only one and two antenna ports are supported), firstSymbolInTimeDomainCSIRS-SL, which indicates the first OFDM symbol in a physical resource block (PRB) used for SL-RSs, and frequDomainAllocationCSIRS-SL, which indicates the frequency domain allocation for SL-RSs. The SL-RS may support a density of one, such that one resource element (RE) may be associated to a physical channel carrying the SL-RS in a given resource block. Sidelink communications do not support zero padded (ZP) CSI-RS.

In some examples, a CQI may be calculated based on a reported RI. The CSI reporting may be aperiodic. In such examples, CSI reporting may be triggered in accordance with the UE receiving sidelink control information (SCI) indicating a transmission of the SL-RS. Wideband CQI reporting is supported for CSI reporting. The UE reports a wideband CQI for an entire CSI reporting band, which may be limited to a transmission band associated with the PSSCH.

Figure 6:
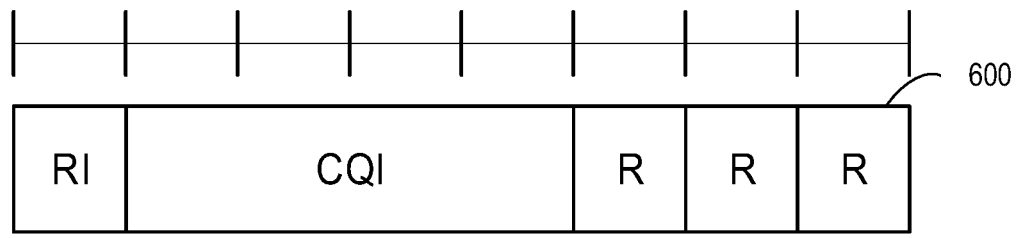
FIG. 6 is a diagram illustrating an example of a sidelink channel state information (CSI) reporting media access control (MAC) control element (MAC) (MAC-CE), in accordance with various aspects of the present disclosure.

FIG. 6 is a diagram illustrating an example of a sidelink CSI reporting MAC-CE 600, in accordance with various aspects of the present disclosure. The sidelink CSI reporting MAC-CE 600 may be identified by a MAC subheader with a logical channel identifier (LCID) specified in the 3GPP Standard. A priority of the sidelink CSI reporting MAC-CE 600 may be fixed at one. As shown in the example of FIG. 6, the sidelink CSI reporting MAC-CE 600 may include an RI, a CQI, and one or more reserved bits (R). The RI indicates a calculated value of the RI. The length of the RI field is 1 bit. The CQI indicates a calculated value of the CQI. The length of the CQI field is 4 bits. The reserved bit may be set to zero and reserved for future use.

In some examples, a transmitter, such as a first SL UE that triggers CSI reporting is not permitted to trigger another aperiodic CSI report from a same receiver, such as a second SL UE, an expected reception of a last slot or completion of the ongoing aperiodic CSI report. The aperiodic CSI report may be associated with the SCI format 2-A with a CSI request field set to one. The expected reception of the last slot for the ongoing CSI report may be defined by the 3GPP Standard. To control a SL CSI reporting procedure, RRC signaling may configure a sl-LatencyBound-CSI-Report parameter for each connection, such as a PC5-RRC connection. The supported range for the sl-LatencyBound-CSI-Report parameter is {3, . . . , 160} slots.

In summary, the UE that triggers CSI reporting is restricted from initiating another aperiodic CSI report for the same UE until the ongoing report is complete, and the expected reception of the last slot is reached. The sl-LatencyBound-CSI-Report parameter, configured by the RRC, is used to regulate the sidelink CSI reporting procedure, with the supported range between 3 to 160 slots.

In some wireless communication interfaces, such as a sidelink interface or a PC5-interface, CSI reports may be included in a MAC-CE. A UE, such as a SL UE, sends different types of CSI reports, each with its own set of content, resolution, and/or bitwidth. For example, a first CSI report may indicate a CQI, an RI, a reference signal received power (RSRP), and a PMI, while a second CSI report may only indicate the CQI and the RI. The UE may also assign different resolutions to CSI reports based on the rate splitting scheme or whether a reconfigurable intelligent surface (RIS) is used. In the case of rate splitting, the CSI of a common stream may be different from the CSI of a private stream. Therefore, the CSI associated with the common stream and the CSI associated with the private stream may have different resolutions. When a RIS is used, the UE may provide a first CSI report when the RIS is turned on (report type 1) and a second CSI report when the RIS is turned off (report type 2). The respective content and respective resolution associated with the first CSI report (report type 1) and the second CSI report (report type 2) may be different.

To manage the transmission of CSI reports, a UE may be configured with different report configurations and/or identifiers (IDs). In some examples, the MAC-CE may include an ID corresponding to a CSI report included in the MAC-CE. In some examples, a maximum of eight report configurations may be supported, and each report may be allocated eight or more bits based on whether other bytes are used for other report configurations. In some examples, a UE may report CSI of different subbands or resource pools. Each subband or resource pool may be associated with a respective report and resolution configuration, thus, allowing a network to obtain a more granular view of the channel conditions and thereby improve resource allocation.

Various aspects of the present disclosure are directed to improving MAC-CE and physical channel CSI reporting. Some aspects are directed to CSI reporting on a MAC-CE using a sidelink or PC5 interface. However, aspects of the present disclosure are not limited to sidelink and PC5, various aspects of the present disclosure may be used in other communication interfaces, such as a Uu interface (for example, base station to UE interface). For example, in the Uu interface, a UE may transmit CSI reports via the MAC-CE in response to a request from a network node, such as a base station.

Particular aspects of the subject matter described in this disclosure can be implemented to realize one or more of the following potential advantages. In some examples, the described MAC-CE may improve the overall performance of the wireless communication system by improving resource allocation, and also improving a quality and reliability of a communication link.

Figure 7:
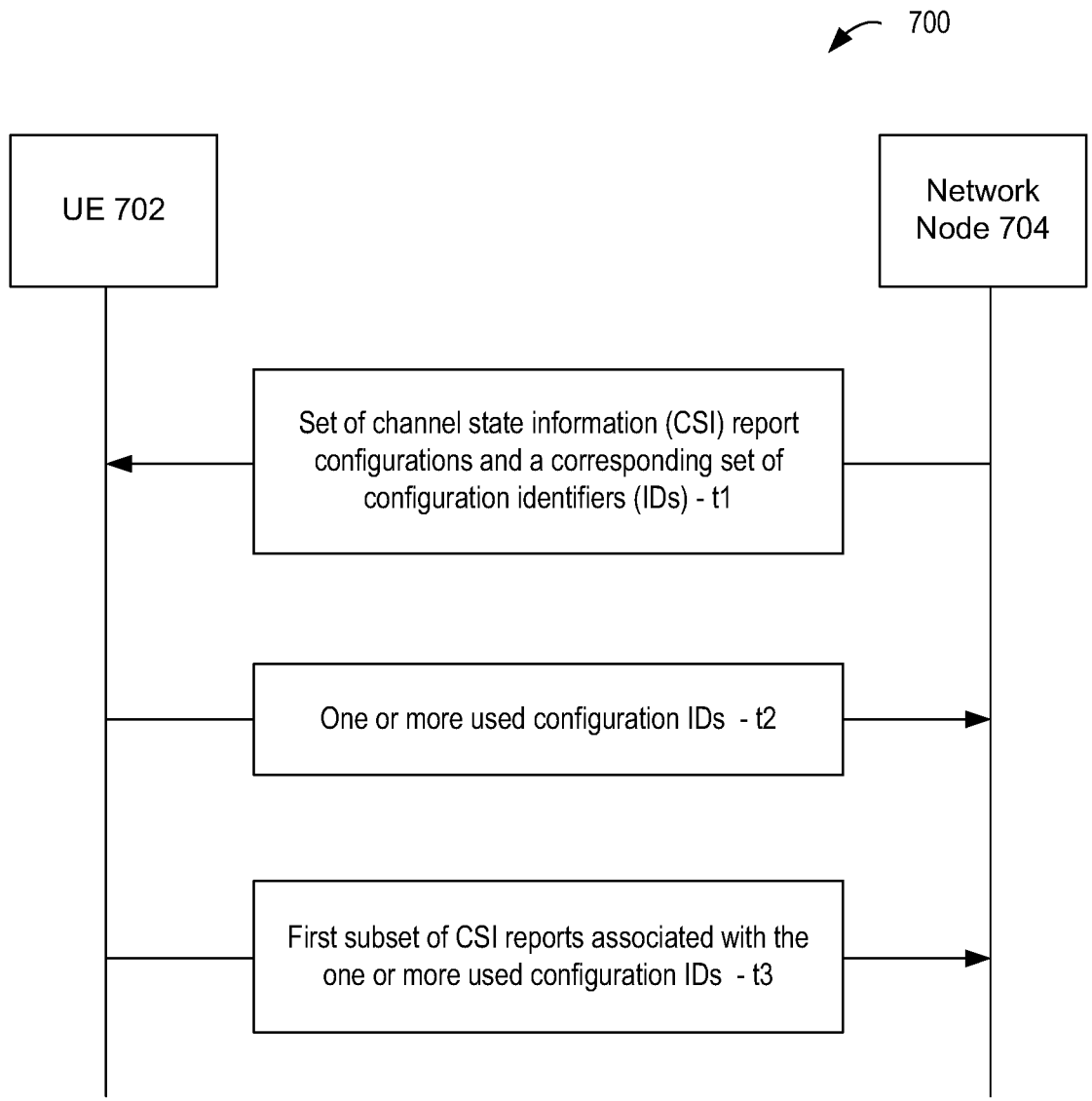
FIG. 7 is a timing diagram illustrating an example of transmitting CSI reports on a MAC-CE, in accordance with various aspects of the present disclosure.

FIG. 7 is a timing diagram illustrating an example 700 of transmitting CSI reports on a MAC-CE, in accordance with various aspects of the present disclosure. In the example 700 of FIG. 7, a UE 702 may communicate with a network node 704 via a sidelink channel, a PC5 channel, a Uu channel, or another type of communication channel. The UE 702 may be an example of a UE 104 described with reference to FIGS. 1 and 2, or a sidelink UE 450, 451, or 452 described with reference to FIG. 4. The network node 704 may be an example of a base station 102 described with reference to FIGS. 1 and 2, a sidelink UE 450, 451, or 452 described with reference to FIG. 4, or a base station 420 or 421 described with reference to FIG. 4.

As shown in the example 700, at time t1, the UE 702 may receive, from the network node 704, a first message indicating a set of CSI report configurations, associated with a set of CSI reports, and a corresponding set of configuration identifiers (IDs). Each CSI report configuration of the set of CSI report configurations may be associated with a respective CSI report of the set of CSI reports and a respective configuration ID of the set of configuration IDs. Additionally, each CSI report may be associated with a respective priority of a set of priorities. In some examples, each CSI report may be associated with a priority corresponding to a respective configuration ID or a respective CSI report configuration. The set of priorities may include a layer 1 (L1) priority and/or a layer 2 (L2) priority. In some examples, one or more configuration IDs may be associated with one or more of logical channels (LCHs) or logical channel groups (LCGs). In such examples, each LCH or LCG is associated with a respective L2 priority (for example, logical channel priority or logical channel group priority). Therefore, the respective L2 priority may be inherited by the CSI report associated with the configuration ID. In other examples, the priority associated with each CSI report may be based on a network configuration or based on a wireless communication standard, such as the 3GPP Standard.

At time t2, the UE 702 transmits, to the network node 704, a second message indicating one or more used configuration IDs of the set of configuration IDs. Each configuration ID of the one or more configuration IDs corresponds to a respective CSI report of a first subset of CSI reports. The first subset of CSI reports may be an example of used CSI reports (for example, CSI reports that will be transmitted to the network node 704 at time t3). In some examples, the second message only includes the used configuration IDs and does not indicate configuration IDs corresponding to unused CSI reports. In some other examples, the second message includes each configuration ID of the group of configuration ID. In some such examples, a respective bit associated with each configuration ID of the group of configuration IDs indicates whether a corresponding CSI report is used or unused. In some examples, the second message may include eight bits allocated for the report configuration IDs, each report configuration ID may be allocated one of the eight bits. The unused CSI reports may be referred to as a second subset of CSI reports. Specifically, the set of CSI reports may include the first subset of CSI reports and the second subset of CSI reports. The first subset of CSI reports may be referred to as used CSI reports and the second subset of CSI reports may be referred to as unused CSI reports.

At time t3, the UE 702 transmits, to the network node 704, the first subset of CSI reports associated with the one or more used configuration IDs. One or more CSI reports of the first subset of CSI reports may be reallocated resources associated with the second subset of CSI reports. In some examples, the resources may be reallocated to the one or more of the first subset of CSI reports based on the priority of the respective configuration ID associated with each of the one or more CSI reports. Reallocating resources to the one or more of the first subset of CSI reports may increase a respective amount of resources associated with each of the one or more CSI reports.

In some examples, each CSI report configuration of the set of CSI report configurations may be associated with one or more types of CSI report content and/or one or more resolution formats. In such examples, the UE 702 may select a respective type of CSI report content and/or a respective resolution format for each CSI report of the first subset of CSI reports in accordance with the one or more types of CSI report content and/or the one or more resolution formats. The CSI report content may include predictive CSI of the used report ID. Information that may be used to perform a prediction, such as CSI prediction times, may be included in the CSI report configurations or previously configured at the UE 702. For example, the UE 702 may estimate the CSI and prediction CSI for configuration ID 0. In such an example, if the UE 702 does not use a CSI report associated with configuration ID 1 contents, the UE 702 may extend the CSI report associated with configuration ID 0 to include the predictive CSI report.

In some examples, the second message and the first subset of CSI reports may be transmitted via a physical uplink control channel (PUCCH), a physical uplink shared channel (PUSCH), a physical sidelink control channel (PSCCH), a physical sidelink shared channel (PSSCH), or a physical sidelink feedback channel (PSFCH). In some such examples, the second message and the first subset of CSI reports may be transmitted via a single MAC-CE or a multi-stage MAC-CE. That is, in some examples, a higher resolution may be specified and a current multi-entry MAC-CE may be utilized. In such examples, the UE may transmit a multi-stage MAC-CE for one or more configuration IDs. Additionally, a header associated with the single MAC-CE or the multi-stage MAC-CE may indicate a respective resolution of one or more CSI reports of the first subset of CSI reports. In some examples, report configuration IDs transmitted at time t2 may be transmitted on a same control channel (for example, PUCCH, PSCCH, or PSFCH) or a same shared channel (for example, PUSCH, or PSSCH) as the first subset of CSI report. In such examples, the report configuration IDs may be allocated to different resource elements or time and frequency resources than resource elements or time and frequency resources allocated to the first subset of CSI reports.

In some examples, the UE 702 may indicate a type of CSI report, such as resolution 1 or resolution 2, within a MAC header along with a corresponding bitwidth. Alternatively, the UE 702 may use L1, L2, or L3 indications with other wireless devices, such as other UEs or the network node 704 to indicate which CSI reports will be sent before transmitting the MAC-CE.

In some examples, one or more checksum bits may be used to ensure that information related to other bytes is transmitted. The one or more checksum bits may be existing bits or new bits. In some examples, the one or more checksum bits may be included in the MAC header.

In some examples, the UE 702 may dynamically indicate a maximum number of report configuration IDs or a maximum number of CSI reports supported by the UE 702. For example, the UE 702 may transmit, to the network node 704, a third message indicating a first number of CSI report configurations supported by the UE in accordance with a current energy profile of the UE. A second number of CSI report configurations included in the group of CSI report configurations may be equal to or less than the first number of CSI report configurations. The third message may be transmitted prior to time t1.

A capability of the UE 702 to simultaneously process multiple reports may increase energy use and processor use at the UE 702. Therefore, the maximum number of CSI reports and/or configuration IDs supported by the UE 702 may be based on a power and energy profile of the UE 702. The power and energy profile may include an energy state profile, a charging rate profile, and/or a discharging rate profile. The third message may be transmitted via L1, L2, or Layer 3 (L3) signaling. In some examples, the third message may be multiplexed with other message included in the L1, L2, or L3 signaling.

In some examples, the resolution and content of each CSI report may also depend on the energy profile. In some cases, the UE 702 may map its energy profile to its capability and share the mapped energy profile the network node 704 and/or other UEs (not shown in FIG. 7). Alternatively, the UE 702 may share its energy profile with the network node 704 and/or the other UEs, such that the network node 704 and/or the other UEs may determine the capability of the UE 702 based on agreed-upon tables, mappings, or specifications.

As discussed, the UE 702 may reallocate resources, such as bytes, of the second subset of CSI reports in a single MAC-CE or multiple-stage MAC-CE. The second subset of CSI reports, associated with a second subset of configuration IDs, may be unused for various reasons. For example, one or more of the second subset of CSI reports may be expired or cancelled. The one or more second subset of CSI reports may be cancelled by a device (for example, network node 704) requesting the CSI reports or a device (for example, UE 702) preparing the CSI reports. In a sidelink communication system, a transmitting UE requests CSI reports from a receiving UE. As another example, the network node 704 may have only requested the first subset of CSI reports associated with the first subset of configuration IDs. In another example, the UE 702 may not have finished preparing one or more of the second subset of CSI reports.

In some examples, one or more bytes may be allocated for reporting the configuration IDs, such as one or more used configuration IDs or the set of configuration IDs configured by the network node. If one byte is allocated, each configuration ID may only support a maximum of eight configuration IDs, with one bit allocated to each configuration ID. Additionally, each CSI report may be allocated one byte. In some examples, the network node 704 and the UE 702 may agree on using more than one byte for CSI reports. In some such examples, if the maximum number of supported configuration IDs is eight, the UE 702 may be configured with four configuration IDs and each CSI report may be allocated two bytes. Increasing an amount of bytes allocated to a CSI report may increase an accuracy of the CSI report as the UE 702 may include more information in each CSI report, thereby improving performance of the wireless communication system.

As discussed, in some examples, the second message includes each configuration ID of the set of configuration IDs. Furthermore, the second message may include a respective bit, associated with each one of the set of configuration IDs, in which the respective bit indicates whether a corresponding CSI report is used or unused. In some examples, a bit value of zero indicates the corresponding CSI report is unused and a bit value of one indicates the corresponding CSI report is used.

Figure 8A:
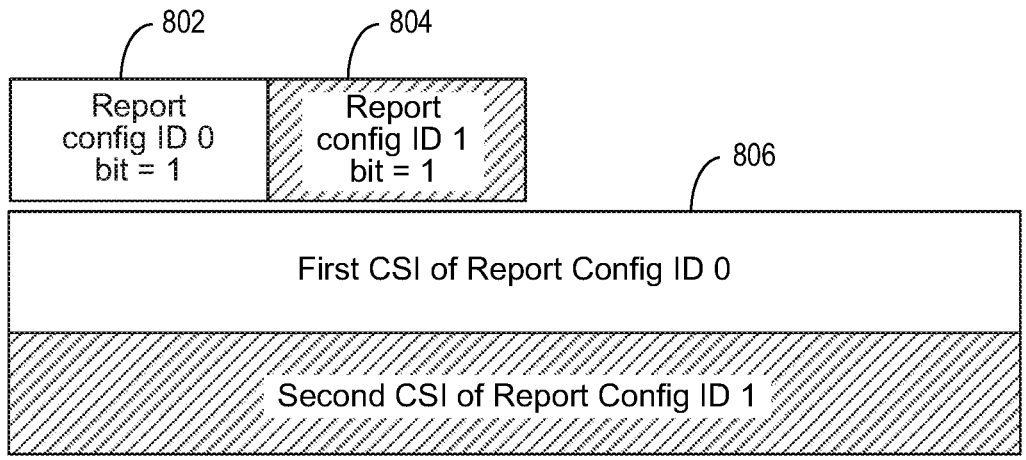
FIG. 8A is a block diagram illustrating an example of configuration identifiers (IDs) and a CSI report payload, in accordance with various aspects of the present disclosure.

FIG. 8A is a block diagram illustrating an example of configuration IDs 802 and 804 and a CSI report payload 806, in accordance with various aspects of the present disclosure. For ease of explanation, in the example of FIG. 8A, a number of CSI report configurations received at the UE is two. In the example of FIG. 8A, each configuration ID 802 and 804 (shown as report config ID 0 and report config ID 1) includes a respective bit indicating whether a corresponding CSI report is used or unused. In this example, the respective bits of each configuration ID 802 and 804 is set to one, indicating the respective CSI reports are used. Therefore, the CSI report payload 806 includes a first CSI report associated with the first configuration ID 802 and a second CSI report associated with the second configuration ID 804.

Figure 8B:
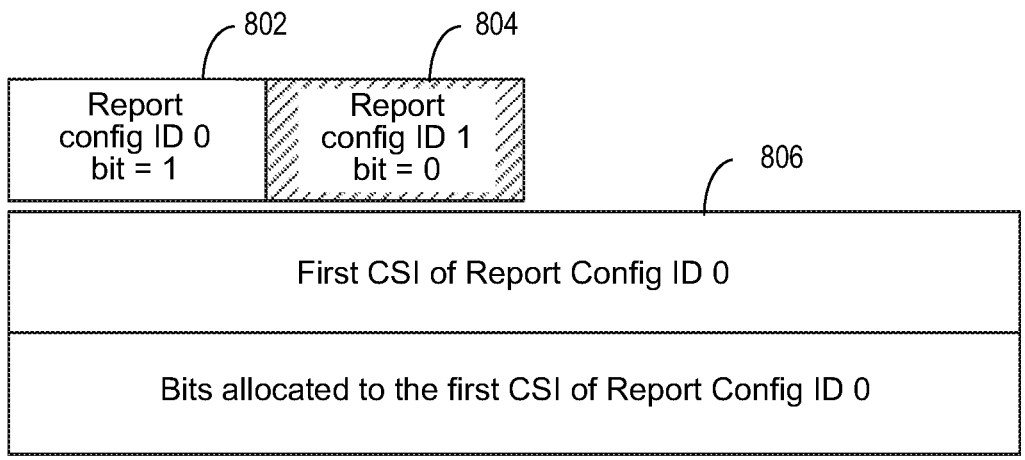
FIG. 8B is a block diagram illustrating an example of configuration IDs and a CSI report payload, in accordance with various aspects of the present disclosure.

FIG. 8B is a block diagram illustrating an example of configuration IDs 802 and 804 and a CSI report payload 806, in accordance with various aspects of the present disclosure. For ease of explanation, in the example of FIG. 8B, a number of CSI report configurations received at the UE is two. In the example of FIG. 8B, each configuration ID 802 and 804 (shown as report config ID 0 and report config ID 1) includes a respective bit indicating whether a corresponding CSI report is used or unused. In this example, the bit of the first configuration ID 802 is set to one indicating the corresponding CSI report is used. Therefore, the CSI report payload 806 includes a first CSI report associated with the first configuration ID 802. Additionally, in this example, the bit of the second configuration ID 804 is set to zero indicating the corresponding CSI report is unused. Therefore, the CSI report payload 806 does not include a second CSI report associated with the second configuration ID 804. Because the second CSI report is unused, resources associated with the second CSI report are reallocated to the first CSI report.

As shown in the example of FIG. 8B, the UE may transmit a CSI report with an extended (for example, longer) format if one or more report configurations (grouped by a configuration ID) are unused. In some examples, to increase or maximize the use of resources, such as bits, the wireless device requesting the CSI report may group configuration IDs and share the set of bits. When one configuration ID is not used, the CSI reports associated with the one or more remaining configuration IDs can use those bits based on their respective priorities.

In some other examples, the UE may jointly encode the configuration IDs. In such examples, the UE may use one codepoint to indicate when a CSI report associated with a configuration ID is not used, while the remaining codepoints may represent a higher resolution report from one or more tables. Additionally, or alternatively, the one or more bits of the set of codepoints may represent a higher resolution report from one or more tables. Additionally, one or more bits may indicate a table type if not indicated in prior to transmitting the MAC-CE.

In some examples, one or more CSI reports of the used CSI reports may include a set of codepoints identifying each unused CSI report (for example, each CSI report of the second subset of CSI reports). For example, a set of code points (a1 a2 a3 a4 a5 a6 a7 a8) may be defined, where each code point corresponds to a configuration ID. In this example, the UE may be configured with eight configurtion IDs. As an example, the set of code points may be set to [1100011], where a value of one indicates the configuration ID is used and a value of zero indicates the configuration ID is unused. As such, a value of one indicates that a CSI report of a corresponding configuration ID associated with a report configuration grouped with one or more other report configurations is extended. The set of codepoints may be configured via L1, L2, or L3 signaling. Alternatively, the set of codepoints may be pre-defined. In some examples, the set of codepoints may indicate a regular resolution format or default or type A resolution, as opposed to a new CSI resolution format.

Figure 8C:
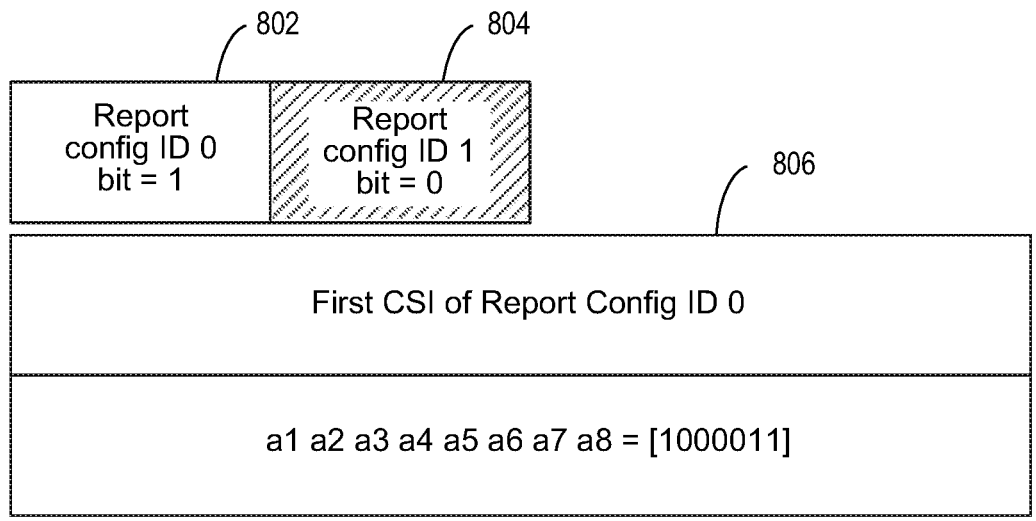
FIG. 8C is a block diagram illustrating an example of configuration IDs and a CSI report payload, in accordance with various aspects of the present disclosure.

FIG. 8C is a block diagram illustrating an example of configuration IDs 802 and 804 and a CSI report payload 806, in accordance with various aspects of the present disclosure. For case of explanation, in the example of FIG. 8C, a number of CSI report configurations received at the UE is two. In the example of FIG. 8C, each configuration ID 802 and 804 (shown as report config ID 0 and report config ID 1) includes a respective bit indicating whether a corresponding CSI report is used or unused. In this example, the bit of the first configuration ID 802 is set to one indicating the corresponding CSI report is used. Therefore, the CSI report payload 806 includes a first CSI report associated with the first configuration ID 802. Additionally, in this example, the bit of the second configuration ID 804 is set to zero indicating the corresponding CSI report is unused. Therefore, the CSI report payload 806 does not include a second CSI report associated with the second configuration ID 804. In this example, the resources (for example, one byte) associated with the second CSI report may be reallocated to a set of codepoints (a1 a2 a3 a4 a5 a6 a7 a8) having a value of [1000011], thereby indicating that the first CSI report is extended based on the allocation of the bits associated with the second CSI report. The set of codepoints may be used in addition to the bits included in each configuration ID, or as an alternative to the bits included in each configuration ID.

In some examples, the set of codepoints, such as X1, X2, X3, . . . , X8, include a first subset of codepoints indicating a table format or a report type and a second subset of codepoints indicating a point in a codebook. Each codepoint of the set of codepoints is associated with one of the first subset of codepoints or the second subset of codepoints. For example, the first subset (X1, X2) may be used as a table format indicator or a report type indicator for each configuration ID in the CSI report. For example, the first subset may indicate that a specific configuration ID uses a specific table format, resolution format, CSI report type. Content of a CSI report may vary based on the CSI report type. Additionally, the second subset (X3, X4, . . . , X8) may be used to fully indicate a point in codebook. The set of codepoints may use resources (for example, bits) of a first unused CSI report or another unused CSI report that is preconfigured.

Figure 9A:
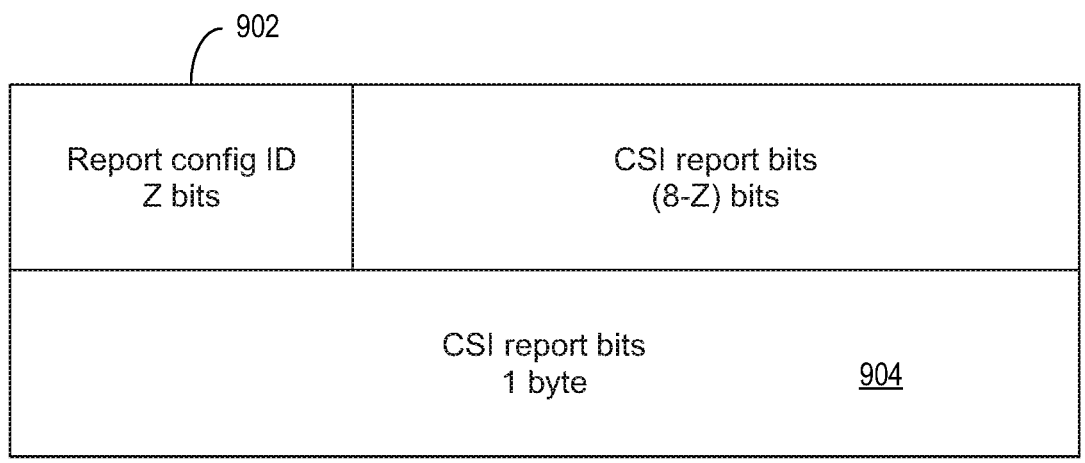
FIG. 9A is a block diagram illustrating an example of a configuration ID and a CSI report payload, in accordance with various aspects of the present disclosure.

In some examples, one or more bits allocated for transmitted report configuration IDs may be reallocated to a CSI report. FIG. 9A is a block diagram illustrating an example of a configuration ID 902 and a CSI report payload 904, in accordance with various aspects of the present disclosure. In the example of FIG. 9A, the configuration ID 902 may be allocated Z bits of X bits, where a value of X may be based on a number of configuration IDs that are active or configured at a UE. In some examples, a default value of X is eight (as shown in the example of FIG. 9A). As shown in FIG. 9A, a number of remaining bits allocated to the configuration IDs (X-Z, or 8-Z) may be reallocated to the CSI report associated with the configuration ID 902. Furthermore, the CSI report may also use the one or more bytes allocated within the CSI report payload 904.

In some examples, the UE may only indicate the configuration IDs associated with used CSI reports, with each CSI report being assigned a fixed or dynamic number of bits. The bits may include remaining bits allocated to the configuration IDs and one or more bytes associated with CSI reports. The number of bits may be assigned in a MAC header. The UE may assign a fixed or dynamic number of bits dynamically indicated by the UE preparing the CSI to the requesting CSI UE. Alternatively, the number of bits may be based on a negotiation and agreement between the transmitting and receiving wireless devices.

As discussed, in some examples, the UE may re-allocate resources associated with one or more unused CSI reports. In some examples, a CSI report may be unused because the UE has discarded the CSI report. In such examples, the UE may discard the CSI report based on one or more of the following: an expiry time of the CSI bound timer sl-LatencyBound-CSI-Report, a reporting or cancellation indication from the wireless device requesting the CSI, or an indication from the network node. Even if the network node is not the requester of CSI, the network node may cancel the CSI report. For example, the network node may cancel the CSI report in sidelink mode 1.

Various aspects of the present disclosure may be applied to various interfaces, such as the Uu interface or a new interface if the network node requests the UE to use a MAC-CE for one or more CSI reports. Additionally, various aspects of the present disclosure may be implemented in energy harvesting devices, active IoT devices, and/or ambient IoT devices. Additionally, various aspects of the present disclosure may be implemented in RRC signaling, including UE associated information, and upper layer reports.

Figure 9B:
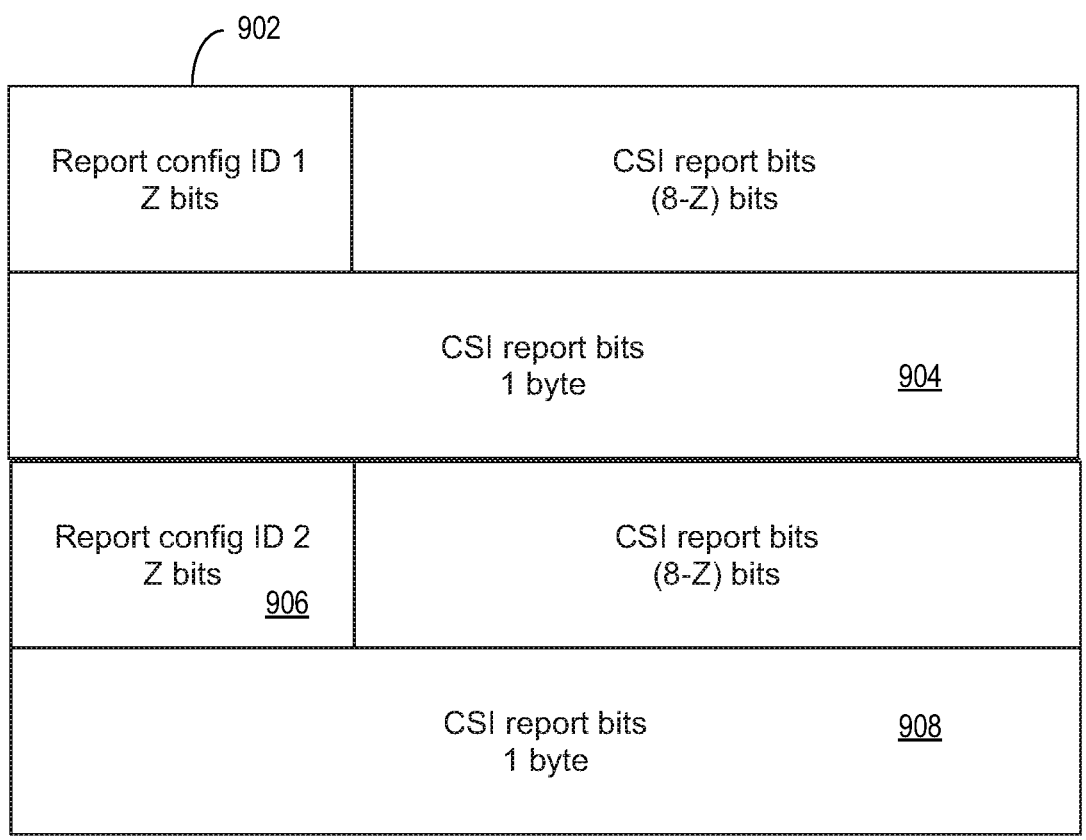
FIG. 9B is a block diagram illustrating an example of two configuration IDs and corresponding CSI report payloads, in accordance with various aspects of the present disclosure.

FIG. 9B is a block diagram illustrating an example of two configuration IDs 902 and 906 and corresponding CSI report payloads 904 and 908, in accordance with various aspects of the present disclosure. In the example of FIG. 9B, each configuration ID 902 and 906 may be allocated Z bits of X bits, where a value of X may be based on a number of configuration IDs that are active or configured at a UE. In some examples, a default value of X is eight (as shown in the example of FIG. 9B). As shown in FIG. 9B, a number of remaining bits allocated to the configuration IDs (X-Z, or 8-Z) may be reallocated to each CSI report associated with the configuration ID 902. Furthermore, the CSI reports may also use the one or more bytes allocated within the respective CSI report payloads 904 and 908.

Figure 10:
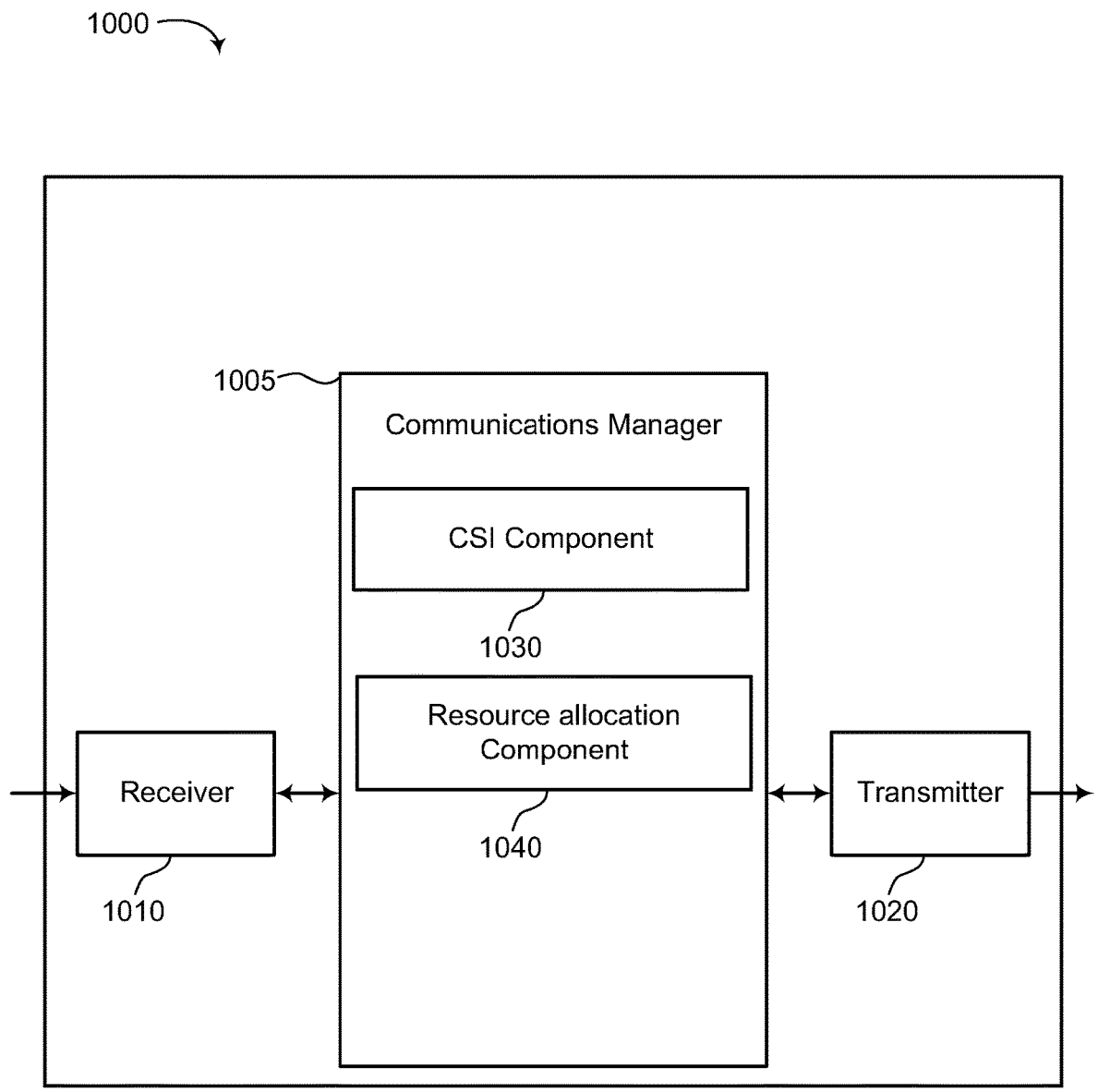
FIG. 10 is a block diagram illustrating an example wireless communication device that supports transmitting one or more configuration IDs and corresponding CSI reports via a MAC-CE at a UE, in accordance with various aspects of the present disclosure.

FIG. 10 is a block diagram illustrating an example wireless communication device 1000 that supports transmitting one or more configuration IDs and corresponding CSI reports via a MAC-CE, in accordance with aspects of the present disclosure. The wireless communication device 1000 may be an example of a base station 104 as described with reference to FIGS. 1 and 2, a CU 310, DU 330, or RU 340 as described with reference to FIG. 3, an RIS 410 as described with reference to FIGS. 4A, 4B, 4C, and 5, or a network node 404 or 406 as described with reference to FIGS. 4A, 4B, 4C, and 5. The wireless communication device 1000 may include a receiver 1010, a communications manager 1005, a CSI component 1030, a resource allocation component 1040, and a transmitter 1020, which may be in communication with one another (for example, via one or more buses). In some examples, the wireless communication device 1000 is configured to perform operations, including operations of the process 1100 described below with reference to FIG. 11.

In some examples, the wireless communication device 1000 can include a chip, system on chip (SOC), chipset, package, or device that includes at least one processor and at least one modem (for example, a 5G modem or other cellular modem). In some examples, the communications manager 1005, or its sub-components, may be separate and distinct components. In some examples, at least some components of the communications manager 1005 are implemented at least in part as software stored in a memory. For example, portions of one or more of the components of the communications manager 1005 can be implemented as non-transitory code executable by the processor to perform the functions or operations of the respective component.

The receiver 1010 may receive one or more reference signals (for example, periodically configured CSI-RSs, aperiodically configured CSI-RSs, or multi-beam-specific reference signals), synchronization signals (for example, synchronization signal blocks (SSBs)), control information, and/or data information, such as in the form of packets, from one or more other wireless communication devices via various channels including control channels (for example, a PUCCH or a PSCCH) and data channels (for example, a PUSCH or a PSSCH). The other wireless communication devices may include, but are not limited to, a UE 104, described with reference to FIGS. 1, 2, 3, 4A 4B, 4C, and 5.

The received information may be passed on to other components of the wireless communication device 1000. The receiver 1010 may be an example of aspects of the receive processor 270 described with reference to FIG. 2. The receiver 1010 may include a set of radio frequency (RF) chains that are coupled with or otherwise utilize a set of antennas (for example, the set of antennas may be an example of aspects of the antennas 234 described with reference to FIG. 2).

The transmitter 1020 may transmit signals generated by the communications manager 1005 or other components of the wireless communication device 1000. In some examples, the transmitter 1020 may be collocated with the receiver 1010 in a transceiver. The transmitter 1020 may be an example of aspects of the transmit processor 216 described with reference to FIG. 2. The transmitter 1020 may be coupled with or otherwise utilize a set of antennas (for example, the set of antennas may be an example of aspects of the antennas 252), which may be antenna elements shared with the receiver 1010. In some examples, the transmitter 1020 is configured to transmit control information in a PDCCH or a PSCCH and data in a PDSCH or PSSCH.

The communications manager 1005 may be an example of aspects of the controller/processor 275 described with reference to FIG. 2. The communications manager 1005 includes the CSI component 1030 and the resource allocation component 1040. In some examples, working in conjunction with the receiver 1010, the CSI component 1030 receives, from a network node, a first message indicating a set of CSI report configurations, associated with a set of CSI reports, and a corresponding set of configuration IDs. Each CSI report configuration of the set of CSI report configurations may be associated with a respective CSI report of the set of CSI reports and a respective configuration ID of the set of configuration IDs. Working in conjunction with the transmitter 1020 the CSI component 1030 transmits, to the network node, a second message indicating one or more used configuration IDs of the set of configuration IDs. Finally, working in conjunction with one or both of the transmitter 1020 or the CSI component 1030, the resource allocation component 1040 transmits, to the network node, a first subset of CSI reports, of the set of CSI reports, associated with the one or more used configuration IDs. One or more CSI reports of the first subset of CSI reports may be reallocated, by the UE, resources associated with a second subset of CSI reports of the set of CSI reports. Each CSI report of the second subset of CSI reports may be associated with an unused configuration ID of the set of configuration IDs.

Figure 11:
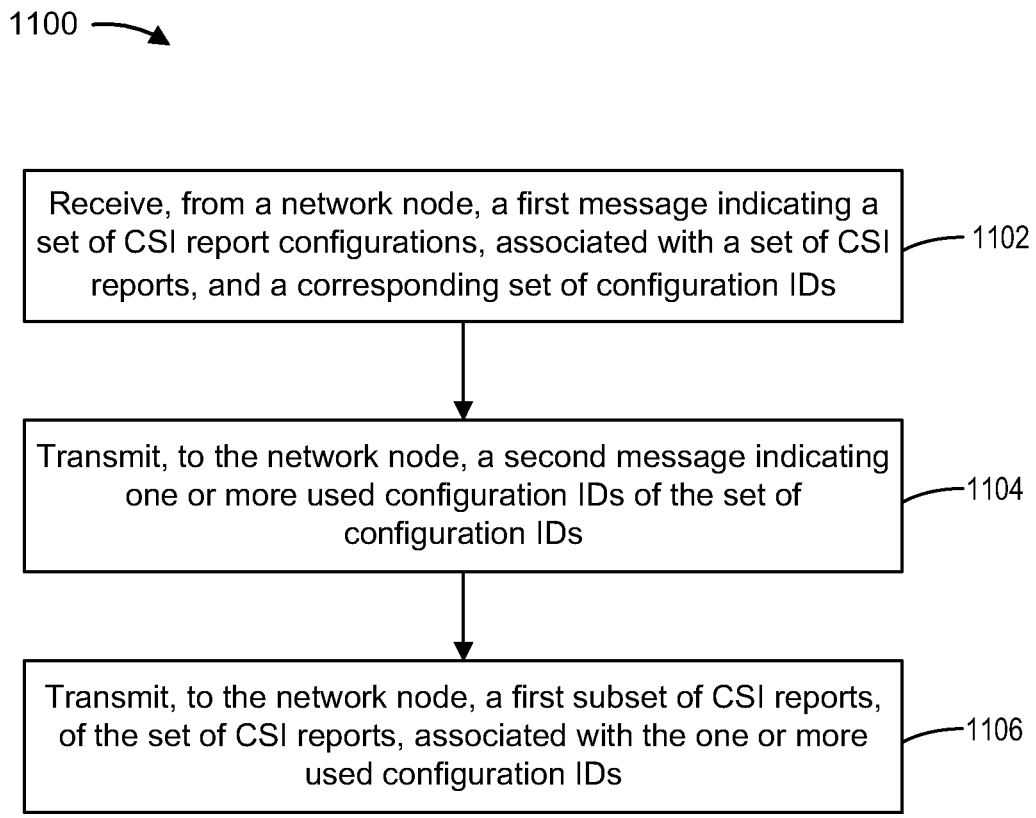
FIG. 11 is a flow diagram illustrating an example process performed, for example, by a UE, in accordance with various aspects of the present disclosure.

FIG. 11 is a flow diagram illustrating an example process 1100 performed, for example, by a UE, in accordance with various aspects of the present disclosure. The UE may be an example of a UE 104 described with reference to FIGS. 1 and 2, a sidelink UE 450, 451, or 452 described with reference to FIG. 4, or a UE 702 described with reference to FIG. 7. The example process 1100 is an example of transmitting one or more configuration IDs and corresponding CSI reports via a MAC-CE. The process 1100 begins at block 1102 by receiving, from a network node, a first message indicating a set of CSI report configurations, associated with a set of CSI reports, and a corresponding set of configuration IDs. Each CSI report configuration of the set of CSI report configurations may be associated with a respective CSI report of the set of CSI reports and a respective configuration ID of the set of configuration IDs. Additionally, each configuration ID may be further associated with a respective priority of a set of priorities. At block 1104, the process 1100 transmits, to the network node, a second message indicating one or more used configuration IDs of the set of configuration IDs. At block 1106, the process 1100 transmits, to the network node, a first subset of CSI reports, of the set of CSI reports, associated with the one or more used configuration IDs. One or more CSI reports of the first subset of CSI reports may be reallocated, by the UE, resources associated with a second subset of CSI reports of the set of CSI reports. Each CSI report of the second subset of CSI reports may be associated with an unused configuration ID of the set of configuration IDs.

Implementation examples are described in the following numbered clauses:

Clause 1. A method for wireless communication by a UE, comprising: receiving, from a network node, a first message indicating a set of CSI report configurations, associated with a set of CSI reports, and a corresponding set of configuration IDs, each CSI report configuration of the set of CSI report configurations being associated with a respective CSI report of the set of CSI reports and a respective configuration ID of the set of configuration IDs, each configuration ID being further associated with a respective priority of a set of priorities; transmitting, to the network node, a second message indicating one or more used configuration IDs of the set of configuration IDs; and transmitting, to the network node, a first subset of CSI reports, of the set of CSI reports, associated with the one or more used configuration IDs, one or more CSI reports of the first subset of CSI reports being reallocated resources associated with a second subset of CSI reports of the set of CSI reports, each CSI report of the second subset of CSI reports being associated with an unused configuration ID of the set of configuration IDs.

Clause 2. The method of Clause 1, wherein the resources are reallocated to the one or more CSI reports, of the first subset of CSI reports, based on the priority of the respective configuration ID associated with each CSI report of the one or more CSI reports.

Clause 3. The method of any one of Clauses 1-2, further comprising transmitting, to the network node, a third message indicating a first number of CSI report configurations supported by the UE in accordance with a current energy profile of the UE, wherein a second number of CSI report configurations included in the set of CSI report configurations is equal to or less than the first number of CSI report configurations.

Clause 4. The method of any one of Clauses 1-3, wherein the second message and the first subset of CSI reports are transmitted via a PUCCH, a PUSCH, a PSCCH, a PSSCH, or a PSFCH.

Clause 5. The method of any one of Clauses 1-4, wherein the second message and the first subset of CSI reports are transmitted via a single MAC-CE or a multi-stage MAC-CE.

Clause 6. The method of Clause 5, wherein a header associated with the single MAC-CE or the multi-stage MAC-CE indicates a respective resolution of one or more CSI reports of the first subset of CSI reports.

Clause 7. The method of any one of Clauses 1-5, wherein: each CSI report configuration of the set of CSI report configurations is associated with one or more types of CSI report content and/or one or more resolution formats; and the method further comprises selecting a respective type of CSI report content and/or a respective resolution format for each CSI report of the first subset of CSI reports in accordance with the one or more types of CSI report content and/or the one or more resolution formats associated with the CSI report configuration corresponding to the CSI report.

Clause 8. The method of any one of Clauses 1-7, wherein: the second message includes each configuration ID of the set of configuration ID; and a respective bit associated with each configuration ID of the set of configuration IDs indicates whether a corresponding CSI report is used or unused.

Clause 9. The method of any one of Clauses 1-8, wherein allocating resources to the one or more CSI reports, of the first subset of CSI reports, increases a respective amount of resources associated with each CSI report of the one or more CSI reports.

Clause 10. The method of any one of Clauses 1-9, wherein a CSI report of the first subset of CSI reports includes a set of codepoints identifying each CSI report of the second subset of CSI reports.

Clause 11. The method of any one of Clauses 1-10, wherein: a CSI report of the first subset of CSI reports includes a set of codepoints; a first subset of codepoints of the set of codepoints indicates a table format or a report type; a second subset of codepoints indicates a point in a codebook; and each codepoint of the set of codepoints is associated with one of the first subset of codepoints or the second subset of codepoints.

Clause 12. The method of any one of Clauses 1-11, wherein the set of priorities includes a layer 1 priority and a layer 2 priority.

Clause 13. The method of any one of Clauses 1-12, wherein one or more CSI report configurations of the set of CSI report configurations are associated with one or more respective logical channels or one or more respective logical channel groups.

Clause 14. The method of any one of Clauses 1-13, wherein the network node is a base station or another UE.

Clause 15. The method of any one of Clauses 1-14, wherein each CSI report of the set of CSI reports is associated with one of the first subset of CSI reports or the second subset of CSI reports.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (for example, related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication by a user equipment (UE), comprising:
receiving, from a network node, a first message indicating a set of channel state information (CSI) report configurations, associated with a set of CSI reports, and a corresponding set of configuration identifiers (IDs), each CSI report configuration of the set of CSI report configurations being associated with a respective CSI report of the set of CSI reports and a respective configuration ID of the set of configuration IDs, each configuration ID being further associated with a respective priority of a set of priorities;
transmitting, to the network node, a second message indicating one or more used configuration IDs of the set of configuration IDs; and
transmitting, to the network node, a first subset of CSI reports, of the set of CSI reports, associated with the one or more used configuration IDs, one or more CSI reports of the first subset of CSI reports being reallocated resources associated with a second subset of CSI reports of the set of CSI reports, each CSI report of the second subset of CSI reports being associated with an unused configuration ID of the set of configuration IDs.

2. The method of claim 1, wherein the resources are reallocated to the one or more CSI reports, of the first subset of CSI reports, based on the priority of the respective configuration ID associated with each CSI report of the one or more CSI reports.

3. The method of claim 1, further comprising transmitting, to the network node, a third message indicating a first number of CSI report configurations supported by the UE in accordance with a current energy profile of the UE, wherein a second number of CSI report configurations included in the set of CSI report configurations is equal to or less than the first number of CSI report configurations.

4. The method of claim 1, wherein the second message and the first subset of CSI reports are transmitted via a physical uplink control channel (PUCCH), a physical uplink shared channel (PUSCH), a physical sidelink control channel (PSCCH), a physical sidelink shared channel (PSSCH), or a physical sidelink feedback channel (PSFCH).

5. The method of claim 1, wherein the second message and the first subset of CSI reports are transmitted via a single medium access control (MAC) control element (CE) (MAC-CE) or a multi-stage MAC-CE.

6. The method of claim 5, wherein a header associated with the single MAC-CE or the multi-stage MAC-CE indicates a respective resolution of one or more CSI reports of the first subset of CSI reports.

7. The method of claim 1, wherein:
each CSI report configuration of the set of CSI report configurations is associated with one or more types of CSI report content and/or one or more resolution formats; and
the method further comprises selecting a respective type of CSI report content and/or a respective resolution format for each CSI report of the first subset of CSI reports in accordance with the one or more types of CSI report content and/or the one or more resolution formats associated with the CSI report configuration corresponding to the CSI report.

8. The method of claim 1, wherein:
the second message includes each configuration ID of the set of configuration ID; and
a respective bit associated with each configuration ID of the set of configuration IDs indicates whether a corresponding CSI report is used or unused.

9. The method of claim 1, wherein reallocating resources to the one or more CSI reports, of the first subset of CSI reports, increases a respective amount of resources associated with each CSI report of the one or more CSI reports.

10. The method of claim 1, wherein a CSI report of the first subset of CSI reports includes a set of codepoints identifying each CSI report of the second subset of CSI reports.

11. The method of claim 1, wherein:
a CSI report of the first subset of CSI reports includes a set of codepoints;
a first subset of codepoints of the set of codepoints indicates a table format or a report type;
a second subset of codepoints indicates a point in a codebook; and
each codepoint of the set of codepoints is associated with one of the first subset of codepoints or the second subset of codepoints.

12. The method of claim 1, wherein the set of priorities includes a layer 1 priority and a layer 2 priority.

13. The method of claim 1, wherein one or more CSI report configurations of the set of CSI report configurations are associated with one or more respective logical channels or one or more respective logical channel groups.

14. The method of claim 1, wherein the network node is a base station or another UE.

15. The method of claim 1, wherein each CSI report of the set of CSI reports is associated with one of the first subset of CSI reports or the second subset of CSI reports.

16. A user equipment (UE), comprising:
one or more processors; and
one or more memories coupled with the one or more processors and storing processor-executable code that, when executed by the one or more processors, is configured to cause the UE to:
receive, from a network node, a first message indicating a set of channel state information (CSI) report configurations, associated with a set of CSI reports, and a corresponding set of configuration identifiers (IDs), each CSI report configuration of the set of CSI report configurations being associated with a respective CSI report of the set of CSI reports and a respective configuration ID of the set of configuration IDs, each configuration ID being further associated with a respective priority of a set of priorities;
transmit, to the network node, a second message indicating one or more used configuration IDs of the set of configuration IDs; and
transmit, to the network node, a first subset of CSI reports, of the set of CSI reports, associated with the one or more used configuration IDs, one or more CSI reports of the first subset of CSI reports being reallocated resources associated with a second subset of CSI reports of the set of CSI reports, each CSI report of the second subset of CSI reports being associated with an unused configuration ID of the set of configuration IDs.

17. The UE of claim 16, wherein the resources are reallocated to the one or more CSI reports, of the first subset of CSI reports, based on the priority of the respective configuration ID associated with each CSI report of the one or more CSI reports.

18. The UE of claim 16, wherein execution of the processor-executable code further causes the UE to transmit, to the network node, a third message indicating a first number of CSI report configurations supported by the UE in accordance with a current energy profile of the UE, wherein a second number of CSI report configurations included in the set of CSI report configurations is equal to or less than the first number of CSI report configurations.

19. The UE of claim 16, wherein the second message and the first subset of CSI reports are transmitted via a physical uplink control channel (PUCCH), a physical uplink shared channel (PUSCH), a physical sidelink control channel (PSCCH), a physical sidelink shared channel (PSSCH), or a physical sidelink feedback channel (PSFCH).

20. The UE of claim 16, wherein the second message and the first subset of CSI reports are transmitted via a single medium access control (MAC) control element (CE) (MAC-CE) or a multi-stage MAC-CE.

21. The UE of claim 20, wherein a header associated with the single MAC-CE or the multi-stage MAC-CE indicates a respective resolution of one or more CSI reports of the first subset of CSI reports.

22. The UE of claim 16, wherein:
each CSI report configuration of the set of CSI report configurations is associated with one or more types of CSI report content and/or one or more resolution formats; and
execution of the processor-executable code further causes the UE to select a respective type of CSI report content and/or a respective resolution format for each CSI report of the first subset of CSI reports in accordance with the one or more types of CSI report content and/or the one or more resolution formats associated with the CSI report configuration corresponding to the CSI report.

23. The UE of claim 16, wherein:
the second message includes each configuration ID of the set of configuration ID; and
a respective bit associated with each configuration ID of the set of configuration IDs indicates whether a corresponding CSI report is used or unused.

24. The UE of claim 16, wherein reallocating resources to the one or more CSI reports, of the first subset of CSI reports, increases a respective amount of resources associated with each CSI report of the one or more CSI reports.

25. The UE of claim 16, wherein a CSI report of the first subset of CSI reports includes a set of codepoints identifying each CSI report of the second subset of CSI reports.

26. The UE of claim 16, wherein:
a CSI report of the first subset of CSI reports includes a set of codepoints;
a first subset of codepoints of the set of codepoints indicates a table format or a report type;
a second subset of codepoints indicates a point in a codebook; and
each codepoint of the set of codepoints is associated with one of the first subset of codepoints or the second subset of codepoints.

27. The UE of claim 16, wherein the set of priorities includes a layer 1 priority and a layer 2 priority.

28. The UE of claim 16, wherein one or more CSI report configurations of the set of CSI report configurations are associated with one or more respective logical channels or one or more respective logical channel groups.

29. The UE of claim 16, wherein the network node is a base station or another UE.

30. The UE of claim 16, wherein each CSI report of the set of CSI reports is associated with one of the first subset of CSI reports or the second subset of CSI reports.

* * * * *